(12) United States Patent
Kamiyama et al.

(10) Patent No.: US 10,985,928 B2
(45) Date of Patent: Apr. 20, 2021

(54) CIRCUIT DEVICE, OSCILLATION DEVICE, PHYSICAL QUANTITY MEASURING DEVICE, ELECTRONIC APPARATUS, AND VEHICLE

(71) Applicant: Seiko Epson Corporation, Tokyo (JP)

(72) Inventors: Masayuki Kamiyama, Chino (JP); Toshiya Usuda, Ina (JP); Hiroshi Kiya, Suwa (JP)

(73) Assignee: Seiko Epson Corporation

( * ) Notice: Subject to any disclaimer, the term of this patent is extended or adjusted under 35 U.S.C. 154(b) by 164 days.

(21) Appl. No.: 15/877,684

(22) Filed: Jan. 23, 2018

(65) Prior Publication Data

US 2018/0212786 A1 Jul. 26, 2018

(30) Foreign Application Priority Data

Jan. 24, 2017 (JP) .............................. JP2017-010045
Oct. 25, 2017 (JP) .............................. JP2017-205959

(51) Int. Cl.
| | | |
|---|---|---|
| *H04L 9/32* | (2006.01) | |
| *H03K 19/003* | (2006.01) | |
| *G06F 1/14* | (2006.01) | |
| *G09C 1/00* | (2006.01) | |
| *G06F 21/44* | (2013.01) | |

(52) U.S. Cl.
CPC .............. *H04L 9/3278* (2013.01); *G06F 1/14* (2013.01); *G06F 21/44* (2013.01); *G06F 21/445* (2013.01); *G09C 1/00* (2013.01); *H03K 19/003* (2013.01)

(58) Field of Classification Search
CPC ............ G06F 1/14; G09C 1/00; H03K 19/003
See application file for complete search history.

(56) References Cited

U.S. PATENT DOCUMENTS

| | | |
|---|---|---|
| 4,453,834 A | 6/1984 | Suzuki et al. |
| 4,893,097 A | 1/1990 | Zwack |
| 4,922,212 A | 5/1990 | Roberts et al. |
| 4,949,055 A | 8/1990 | Leitl |
| 5,117,206 A * | 5/1992 | Imamura ................. H03L 1/026 331/158 |
| 5,548,252 A | 8/1996 | Watanabe et al. |
| 5,574,408 A | 11/1996 | Zwack |
| 5,617,084 A | 4/1997 | Sears |

(Continued)

FOREIGN PATENT DOCUMENTS

JP  2010-225009 A  10/2010

OTHER PUBLICATIONS

Eiroa, Susana, and Iluminada Baturone. "Circuit authentication based on ring-oscillator pufs." 2011 18th IEEE International Conference on Electronics, Circuits, and Systems. IEEE, 2011. (Year: 2011).*

(Continued)

*Primary Examiner* — Madhuri R Herzog
(74) *Attorney, Agent, or Firm* — Harness, Dickey & Pierce, P.L.C.

(57) ABSTRACT

A circuit device includes an oscillation circuit that generates an oscillation signal by using an oscillator, a processing unit that controls the oscillation circuit, and an interface unit that outputs authentication information to an external device. The authentication information being information based on specific information of the circuit device and is used to authenticate the circuit device.

16 Claims, 13 Drawing Sheets

(56) References Cited

U.S. PATENT DOCUMENTS

| | | | |
|---|---|---|---|
| 5,740,525 | A | 4/1998 | Spears |
| 5,754,081 | A * | 5/1998 | Kuroiwa .............. G06F 1/08 |
| | | | 331/173 |
| 5,781,073 | A | 7/1998 | Mii |
| 5,892,408 | A | 4/1999 | Binder |
| 7,003,273 | B1 * | 2/2006 | Shimanuki .............. H03B 5/04 |
| | | | 331/176 |
| 9,444,618 | B1 | 9/2016 | Trimberger et al. |
| 9,762,241 | B1 * | 9/2017 | Augustine ........ H03K 19/00315 |
| 2003/0204743 | A1 * | 10/2003 | Devadas .............. G06F 21/31 |
| | | | 726/9 |
| 2012/0212253 | A1 * | 8/2012 | Lewis .............. H03K 19/17776 |
| | | | 326/8 |
| 2013/0187764 | A1 * | 7/2013 | Smith .............. H04L 9/3271 |
| | | | 340/10.42 |
| 2015/0042410 | A1 | 2/2015 | Yoneyama |
| 2015/0046715 | A1 | 2/2015 | Ignatchenko |
| 2015/0053006 | A1 * | 2/2015 | Decoux .............. G04D 7/1207 |
| | | | 73/579 |
| 2016/0110571 | A1 * | 4/2016 | Jung .............. G06F 21/602 |
| | | | 340/10.1 |
| 2016/0277025 | A1 * | 9/2016 | Tanamoto .............. G09C 1/00 |
| 2017/0310688 | A1 * | 10/2017 | Lecomte .............. G09C 1/00 |
| 2018/0131529 | A1 * | 5/2018 | Cambou .............. H04L 9/006 |

OTHER PUBLICATIONS

S. Eiroa and I. Baturone, "Circuit authentication based on Ring-Oscillator PUFs," 2011 18th IEEE International Conference on Electronics, Circuits, and Systems, Beirut, 2011, pp. 691-694, doi: 10.1109/ICECS.2011.6122368. (Year: 2011).*

Maiti, Abhranil, and Patrick Schaumont. "Improved ring oscillator PUF: An FPGA-friendly secure primitive." Journal of cryptology 24.2 (2011): 375-397. (Year: 2011).*

Nakano, M. et al., "Automotive Information Security", Thereat and Countermeasure of ECU/On-Vehicle LAN/Outside-Vehicle Network, dated Oct. 26, 2020, 12 Pages, with English Translation.

* cited by examiner

| ADDRESS | DATA Dm ... D2 D1 |
|---|---|
| 0 | DATA0 |
| 1 | DATA1 |
| 2 | DATA2 |
| 3 | DATA3 |
|  | ⋮ |
| 127 | DATA127 |

FIG. 7

|  | PART | PARAMETER | ADDRESS REGION IN WHICH VARIATION TENDS TO OCCUR |
|---|---|---|---|
| EXAMPLE 1 | OSCILLATOR | SECONDARY COEFFICIENT OF TEMPERATURE CHARACTERISTIC | LOW TEMPERATURE-SIDE ADDRESS (IN VICINITY OF ADDRESS 0) HIGH TEMPERATURE-SIDE ADDRESS (IN VICINITY OF ADDRESS 127) |
| EXAMPLE 2 | OSCILLATOR | PEAK TEMPERATURE OF TEMPERATURE CHARACTERISTIC | LOW TEMPERATURE-SIDE ADDRESS (IN VICINITY OF ADDRESS 0) HIGH TEMPERATURE-SIDE ADDRESS (IN VICINITY OF ADDRESS 127) |
| EXAMPLE 3 | OSCILLATOR | OSCILLATION FREQUENCY AT 25°C | MIDDLE TEMPERATURE ADDRESS (IN VICINITY OF ADDRESS 63) |
| EXAMPLE 4 | OSCILLATOR | REGULATION CHARACTERISTIC OF CAPACITANCE VALUE | LOW TEMPERATURE-SIDE ADDRESS (IN VICINITY OF ADDRESS 0) HIGH TEMPERATURE-SIDE ADDRESS (IN VICINITY OF ADDRESS 127) |
| EXAMPLE 5 | CIRCUIT DEVICE | A/D ACCURACY (TEMPERATURE SENSOR ACCURACY) | LOW TEMPERATURE-SIDE ADDRESS (IN VICINITY OF ADDRESS 0) HIGH TEMPERATURE-SIDE ADDRESS (IN VICINITY OF ADDRESS 127) |
| EXAMPLE 6 | CIRCUIT DEVICE | VARIATION IN CAPACITANCE VALUE | LOW TEMPERATURE-SIDE ADDRESS (IN VICINITY OF ADDRESS 0) HIGH TEMPERATURE-SIDE ADDRESS (IN VICINITY OF ADDRESS 127) |

FIG. 9

CIRCUIT DEVICE, OSCILLATION DEVICE, PHYSICAL QUANTITY MEASURING DEVICE, ELECTRONIC APPARATUS, AND VEHICLE

BACKGROUND

1. Technical Field

The present invention relates to a circuit device, an oscillation device, a physical quantity measuring device, an electronic apparatus, a vehicle, and the like.

2. Related Art

In a system using an oscillation device, such as a real-time clocking device, or a physical quantity measuring device, there is a possibility that hacking may occur due to, for example, forgery or data disguise, which may give rise to security measures to prevent such hacking.

The related art of security measures in a real-time clocking device includes, for example, a technique disclosed in JP-A-2010-225009. In JP-A-2010-225009, when an external device attempts to access the real-time clocking device, the external device transmits an access code to the real-time clocking device, the real-time clocking device collates the access code with an expected value, and the real-time clocking device permits the access in a case where the access code matches the expected value and prohibits the access in a case where the access code does not match the expected value.

However, in the above-described related art, an oscillation device or a physical quantity measuring device can authenticate the external device, but there is a problem in that it is not possible to cope with a forgery of the oscillation device or the physical quantity measuring device. Examples of the assumed forgery of the oscillation device or the physical quantity measuring device include an exchange with a fraudulent oscillation device or physical quantity measuring device (for example, a modified device or the like), the transmission of fraudulent data from a fraudulent device disguised as the oscillation device or the physical quantity measuring device to the external device, and the like.

SUMMARY

According to some aspects of the invention, it is possible to provide a circuit device, the oscillation device, the physical quantity measuring device, an electronic apparatus, a vehicle, and the like which are capable of reducing a concern for the forgery of an oscillation device or a physical quantity measuring device.

The invention can be implemented in the following exemplary configurations.

An aspect of the invention relates to a circuit device including an oscillation circuit that generates an oscillation signal by using an oscillator, a processing unit that controls the oscillation circuit, and an interface unit that outputs authentication information to an external device, the authentication information being information based on specific information of the circuit device and is used to authenticate the circuit device.

According to the aspect of the invention, the authentication information, which is information based on specific information of the circuit device and is used to authenticate the circuit device, is output to the external device through the interface unit from the circuit device. Thereby, the external device can authenticate the circuit device on the basis of the received authentication information, and thus it is possible to reduce a concern for the forgery of the circuit device (oscillation device, physical quantity measuring device).

In the aspect of the invention, the circuit device may further include a non-volatile memory that stores oscillation adjustment data of the oscillation circuit and the specific information, or stores the oscillation adjustment data as the specific information. The interface unit may output the authentication information based on the specific information stored in the non-volatile memory to the external device.

According to the aspect of the invention with this configuration, it is possible to store the specific information by using an empty region of a non-volatile memory for storing the oscillation adjustment data of the oscillation circuit. Alternatively, it is possible to use the oscillation adjustment data stored in the non-volatile memory as specific information.

In the aspect of the invention, the circuit device may further include an encoding processing unit. The interface unit may output the authentication information encoded by the encoding processing unit to the external device.

In this manner, it is possible to reduce a possibility that security is broken as compared to a case where the circuit device transmits the authentication information to the external device in non-encoded data, and to improve the security of a system.

In the aspect of the invention, the interface unit may receive external device authentication information for authenticating the external device, and the processing unit may perform authentication processing of the external device on the basis of the external device authentication information.

In this manner, it is possible to perform mutual authentication between the external device and the circuit device. That is, it is possible to improve security not only with respect to the forgery of the circuit device (oscillation device, physical quantity measuring device) but also with respect to the forgery of the external device as an opposite party communicating with the circuit device.

In the aspect of the invention, the circuit device may further include an encoding processing unit that decodes the encoded external device authentication information.

In this manner, it is possible to improve security as compared to a case where the circuit device receives the external device authentication information from the external device in non-encoded data. In addition, it is possible to decode the external device authentication information by sharing the encoding processing unit that encodes the authentication information transmitted from the circuit device with the external device.

In the aspect of the invention, the circuit device may further include a random number data output unit that outputs random number data. The interface unit may output the authentication information, which is generated by a combination of the specific information and the random number data, to the external device.

In this manner, the authentication information becomes complex as compared to a case where the circuit device transmits the authentication information, which is generated without combining it with the random number data, to the external device, and thus it is possible to reduce a possibility that security is broken and to improve the security of the system.

In the aspect of the invention, the authentication information may be data in which bits of the specific information are allocated to predetermined bits of the authentication information and bits of the random number data are allocated to the other bits of the authentication information.

In this manner, bits of the specific information are allocated to predetermined bits of the authentication information and bits of the random number data are allocated to the other bits of the authentication information, so that it is possible to combine the specific information and the random number data with each other to generate the authentication information. The external device can acquire the specific information by extracting the predetermined bits having the bits of the specific information allocated thereto, from the authentication information.

In the aspect of the invention, the interface unit may output the authentication information generated by a combination of the specific information and circuit characteristic adjustment data.

Since circuit characteristics have individual variations, the circuit characteristic adjustment data for adjusting the individual variations also has individual variations. For this reason, the circuit characteristic adjustment data can be used as the random number data.

In the aspect of the invention, the authentication information may be data in which bits of the specific information are allocated to predetermined bits of the authentication information and bits of the circuit characteristic adjustment data are allocated to the other bits of the authentication information.

In this manner, bits of the specific information are allocated to predetermined bits of the authentication information and bits of the circuit characteristic adjustment data are allocated to the other bits of the authentication information, so that it is possible to combine the specific information and the circuit characteristic adjustment data with each other to generate the authentication information. The external device can acquire the specific information by extracting the predetermined bits having the bits of the specific information allocated thereto, from the authentication information.

In the aspect of the invention, the specific information may be specific Physically Unclonable Function (PUF) information of the circuit device.

Since the PUF information uses individual variations in hardware characteristics, there is an extremely low possibility that a circuit device having the same PUF information can be duplicated. Such PUF information is used as specific information, and thus it is possible to reduce a concern for the forgery of the circuit device (oscillation device, physical quantity measuring device) due to duplication and to improve security.

In the aspect of the invention, the PUF information may be information which is generated on the basis of temperature compensated data of an oscillation frequency of the oscillation signal.

According to the aspect of the invention with this configuration, the specific PUF information of the circuit device is generated on the basis of the temperature compensated data. The oscillation device performing temperature compensation stores the temperature compensated data, and the temperature compensated data has individual variations. For this reason, it is possible to generate the PUF information specific to the circuit device from the temperature compensated data.

In the aspect of the invention, the circuit device may further include a clocking unit that generates clocking data which is real-time clock information, on the basis of the oscillation signal, in which the interface unit may output the clocking data to the external device, and the authentication information may be information for authenticating the circuit device that outputs the clocking data.

For example, there is a possibility that a system time is set as a fraudulent time due to the forgery of a real-time clocking device that outputs clocking data. In this regard, according to the aspect of the invention, the authentication information for causing the external device to authenticate the circuit device can be output from the circuit device to the external device, and thus it is possible to reduce a concern for the forgery of the real-time clocking device. Thereby, it is possible to improve the security of the system including the real-time clocking device.

In the aspect of the invention, the circuit device may further include a time digital conversion circuit that performs time digital conversion on the basis of the oscillation signal. The interface unit may output information, which is generated on the basis of the time digital conversion, to the external device.

Such a time digital converter is one of the devices that is likely to communicate with the external device, and there is a concern for the forgery of the time digital converter. In this regard, according to the aspect of the invention, since the circuit device can output the authentication information to the external device, the external device can authenticate the time digital converter, and it is possible to reduce a concern for the forgery of the time digital converter.

Another aspect of the invention relates to an oscillation device including the circuit device according to any one of the aspects described above and the oscillator.

Still another aspect of the invention relates to a physical quantity measuring device including the circuit device according to any one of the aspects described above and the oscillator.

Still another aspect of the invention relates to an electronic apparatus including the circuit device according to any one of the above-described aspects and the external device.

Still another aspect of the invention relates to a vehicle including the circuit device according to any one of the above-described aspects and the external device.

BRIEF DESCRIPTION OF THE DRAWINGS

Embodiments of the invention will be described with reference to the accompanying drawings, wherein like numbers reference like elements.

FIG. 7 illustrates an example of temperature compensated data stored in a non-volatile memory.

FIG. 9 illustrates an example of the selection of an address at the time of generating specific information.

DESCRIPTION OF EXEMPLARY EMBODIMENTS

Hereinafter, a preferred exemplary embodiment of the invention will be described in detail. The exemplary embodiment described below does not limit to the scope of the invention described in the appended claims, and all configurations described in this exemplary embodiment are not necessarily essential to the invention.

Hereinafter, a description will be given of an example of a case where an oscillation device is a real-time clocking device, but the invention is not limited thereto. The invention can also be applied to various oscillation devices (an oscillator such as a temperature compensated crystal oscillator (TCXO)), a physical quantity measuring device (for example, a time digital converter) using the oscillator, and the like.

1. Circuit Device

As described above, the real-time clocking device (oscillation device) of the related art performs security measures against forgery on the external device side. For this reason, in a case where the real-time clocking device is viewed from the external device, security measures have not been performed against the forgery of the real-time clocking device.

For example, a system including a CPU which is an external device and a real-time clocking device which transmits clocking data to the CPU is considered. In such a system, it is possible to assume forgery such as the exchange of a real-time clocking device mounted on a substrate with a fraudulent device or communication with the CPU by disguising as if it is communication with the real-time clocking device. In a case where such a fraudulent action is performed, there is a possibility that hacking such as the transmission of fraudulent clocking data to the CPU or making the CPU perform false authentication by using a past electronic signature (supposed to be already invalidated).

For example, in a vehicle such as an automobile, an internal network and an external network (or an external device) of the vehicle communicate with each other through various communications such as mobile communication, Bluetooth (registered trademark) communication, or wired communication. There is a concern that the hacking of the internal network through such communication and the forgery of the real-time clocking device may occur.

Figure 1:
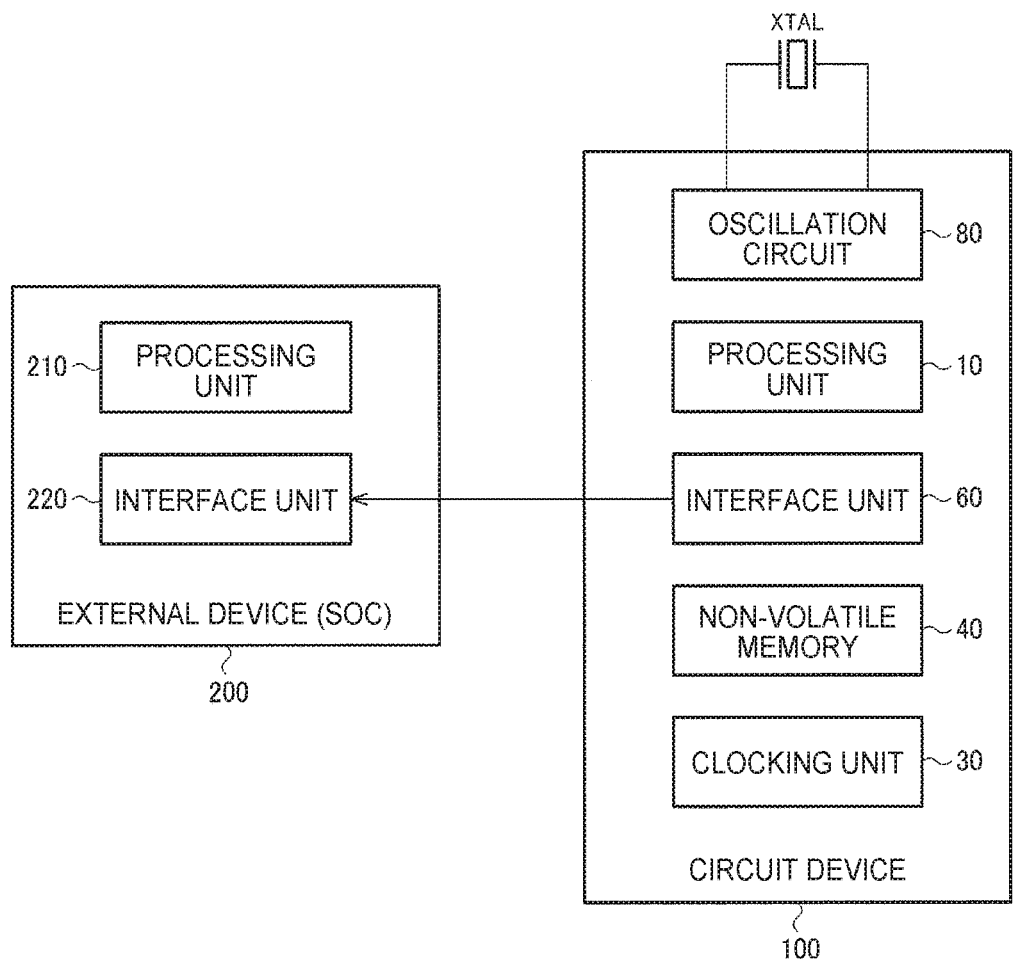
FIG. 1 illustrates a configuration example of a circuit device according to this exemplary embodiment.

FIG. 1 illustrates a configuration example of the circuit device according to this exemplary embodiment capable of solving the above-described problem, and a system including the circuit device. The system in FIG. 1 includes an external device 200 and a circuit device 100. The external device 200 includes a processing unit 210 (processing circuit) and an interface unit 220 (interface circuit). The circuit device 100 includes an oscillation circuit 80, a processing unit 10 (processing circuit), and an interface unit 60 (interface circuit). In addition, the circuit device 100 may include a non-volatile memory 40. In addition, the circuit device 100 may include a clocking unit 30 (a clock module). The circuit device is not limited to the configuration illustrated in FIG. 1, and various modifications such as the omission of a portion of the components and the addition of other components can be made thereto.

The external device 200 is, for example, a System On Chip (SOC). Alternatively, the external device may be a processing device such as a CPU or an MPU. The circuit device 100 can be realized by, for example, an integrated circuit device. For example, the circuit device 100 and an oscillator XTAL of FIG. 1 are combined with each other to configure a real-time clocking device. This exemplary embodiment is not limited to the configuration illustrated in FIG. 1, and various modifications such as the omission of a portion of the components and the addition of other components can be made thereto.

The oscillation circuit 80 generates an oscillation signal by using an oscillator XTAL. The processing unit 10 controls the oscillation circuit 80. The interface unit 60 outputs authentication information to the external device 200. The authentication information is information based on (corresponding to) specific information of the circuit device 100 and is used to authenticate the circuit device 100.

The specific information of the circuit device 100 is information uniquely corresponding to an individual circuit device. That is, the information is information for identifying an individual circuit device or the validity of the circuit device (for example, whether or not the circuit device is an assumed product) on the basis of the specific information. As described later, the specific information may be PUF information, for example, using variations in characteristics of hardware, or may be identification information which is arbitrarily added. The specific information may be information which is not completely overlapped, or may be allowed to be overlapped in a range for maintaining security.

The authentication information is information for determining whether to allow communication by authenticating the circuit device which is a target for communication. That is, the authentication information is information for determining whether or not the circuit device which is a target for communication is valid (for example, whether or not the circuit device is an assumed product). The authentication information may be the specific information itself, or may be information generated by performing processing on the specific information. For example, data of the authentication information may be data obtained by extracting a portion of data (bits) from the data of the specific information, data obtained by adding random data (for example, random number data) to the specific information, or data obtained by encoding the pieces of data or the specific information itself.

The external device 200 receives the authentication information which is output (transmitted) from the interface unit 60 of the circuit device 100 through the interface unit 220. The processing unit 210 performs authentication processing on the basis of the received authentication information, and determines whether to authenticate the circuit device 100 (whether to allow communication with the circuit device 100). For example, the authentication processing is performed by comparing the received authentication information with an expected value. Subsequent communication with the circuit device 100 is not allowed in a case where the authentication is not successful, and a normal communication process such as initial setting of the circuit device 100 or data communication with the circuit device 100 is allowed in a case where the authentication is successful.

According to this exemplary embodiment, it is possible to output the authentication information for causing the external device 200 to authenticate the circuit device 100 from the circuit device 100 to the external device 200. Thereby, it is possible to reduce a concern for the forgery of the circuit device 100 (real-time clocking device including the circuit device 100). That is, the external device 200 can determine whether or not the circuit device 100 which has transmitted the authentication information (that is, which is connected to the external device 200) is a device which is a target for communication, on the basis of the authentication information. Thereby, in a case where a fraudulent action, such as an exchange of the real-time clocking device mounted on the substrate with a fraudulent device, occurs, it is possible to detect the occurrence of the fraudulent action and to improve security.

In this exemplary embodiment, the clocking unit 30 generates clocking data which is real-time clock information on the basis of an oscillation signal. The interface unit 60 outputs clocking data to the external device 200, and the authentication information is information for authenticating the circuit device 100 that outputs the clocking data.

The external device 200 receives the clocking data through the interface unit 220, and the processing unit 210 performs processing based on the received clocking data. For example, the processing unit 210 reads out the clocking data from the circuit device 100 (real-time clocking device) in a turn-on state of a main power supply of the system, and initializes a system time.

The clocking data is data indicating a time as the real-time clock information. That is, the clocking data is data regarding a time clocked as the real-time clock information by the clocking unit 30. For example, the clocking data is data indicating a date and time, and may include calendar data and time data. For example, the calendar data is data such as year, month, week, and day, and the time data is data such as hour, minute, and second. For example, the clocking unit 30 performs frequency division of the oscillation signal to generate clock signals in cycles of one second, and measures a time by counting the clock signals.

The real-time clocking device is a device which is operated by a backup power supply, such as a battery, even when the main power supply of the system is turned off, and continues clocking (measurement of the real time). When the main power supply is turned on, the external device 200 initializes the time of the system with reference to the clocking data of the real-time clocking device. For example, in a case where the external device 200 performs data authentication by using an electronic signature, the external device 200 compares an issuance time of the electronic signature attached to data transmitted through a network or the like with the system time to verify the electronic signature. In this case, the system time is required to be set as a correct time, but the system time could be set as a fraudulent time due to the forgery of the real-time clocking device, which may result in a concern that it is not possible to correctly verify the electronic signature.

In this regard, according to this exemplary embodiment, authentication information for making the external device 200 authenticate the real-time clocking device (circuit device 100) can be output from the circuit device 100 to the external device 200, and thus it is possible to reduce a concern for the forgery of the real-time clocking device. Thereby, it is possible to improve the security of the system including the real-time clocking device.

In this exemplary embodiment, the non-volatile memory 40 stores oscillation adjustment data of the oscillation circuit 80. Specifically, the non-volatile memory 40 stores the oscillation adjustment data and specific information, or stores the oscillation adjustment data as specific information. The interface unit 60 outputs authentication information based on the specific information stored in the non-volatile memory 40 to the external device 200.

The oscillation adjustment data is data for adjusting (setting) oscillation characteristics of the oscillator XTAL and the oscillation circuit 80. For example, the oscillation adjustment data is data for adjusting an oscillation frequency at a reference temperature (for example, 25° C.) to a predetermined frequency (a frequency which is specified in specifications). Alternatively, in a case where the circuit device 100 performs temperature compensation of the oscillation frequency, the oscillation adjustment data is temperature compensated data. The oscillation adjustment data is, for example, trimming data of an analog circuit (for example, a resistance division circuit, an amplifier circuit, or the like that outputs a reference voltage), or control data for controlling a switch of a capacitor array. Alternatively, the oscillation adjustment data is data for generating the above-described trimming data or control data by the processing of the oscillation adjustment data. For example, in a case where control data corresponding to each temperature is stored in the non-volatile memory 40 in the temperature compensation, the control data is oscillation adjustment data. Alternatively, in a case where a control voltage of VCO is generated by an approximate polynomial expression with a temperature as a variable, coefficient data of the approximate polynomial expression is oscillation adjustment data.

The non-volatile memory 40 stores specific information, for example, separately from the oscillation adjustment data. In this case, the specific information is data, such as identification data (ID), which is uniquely added to the circuit device 100, and is written in the non-volatile memory 40, for example, during the manufacture of the circuit device 100 or the real-time clocking device. Alternatively, the oscillation adjustment data stored in the non-volatile memory 40 may be used as specific information. In this case, the oscillation adjustment data is PUF information.

In order to store the oscillation adjustment data of the oscillation circuit 80, the non-volatile memory 40 may be provided. In this exemplary embodiment, it is possible to store specific information by using an empty region of the non-volatile memory 40. Alternatively, the oscillation adjustment data stored in the non-volatile memory 40 can be used as specific information. That is, since the oscillation characteristics of the oscillation circuit 80 include individual variations, oscillation adjustment data for adjusting the individual variations also include individual variations, and thus it is possible to use the oscillation adjustment data as specific information of the circuit device 100.

A description has been given of a case where the non-volatile memory 40 stores specific information, but this exemplary embodiment is not limited thereto. That is, a component other than the non-volatile memory 40 may output, store, or generate the specific information. For example, the circuit device 100 may include an SRAM, and initial data (PUF information) of the SRAM during the start-up of the circuit device 100 may be used as specific information. Alternatively, the circuit device 100 may include a PUF circuit that generates PUF information by using individual variations in a delay time of a delay element, and the PUF information which is output by the PUF circuit may be used as specific information.

Figure 4:
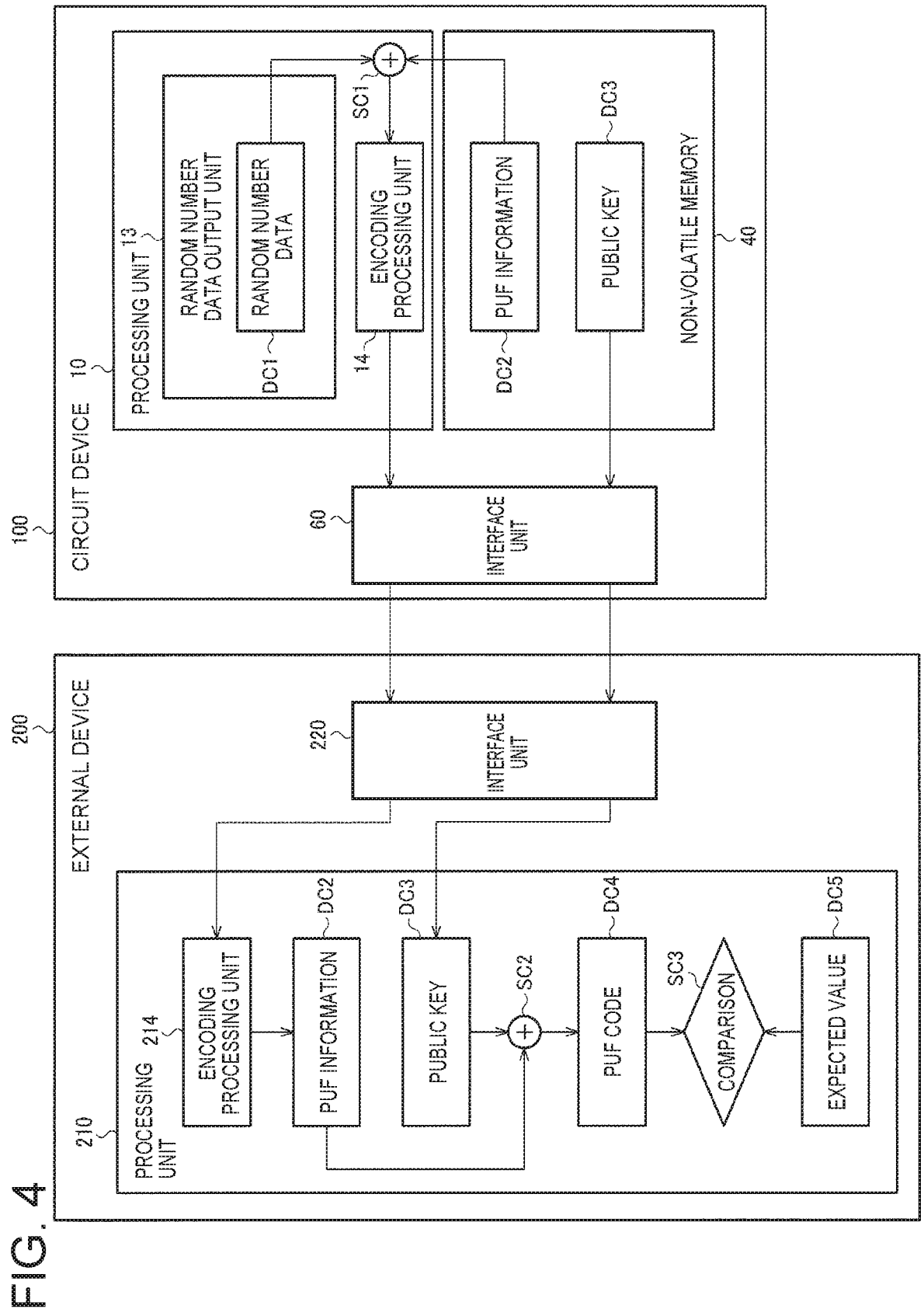
FIG. 4 illustrates a third detailed configuration example of the circuit device and the system including the circuit device according to this exemplary embodiment.
Figure 5:
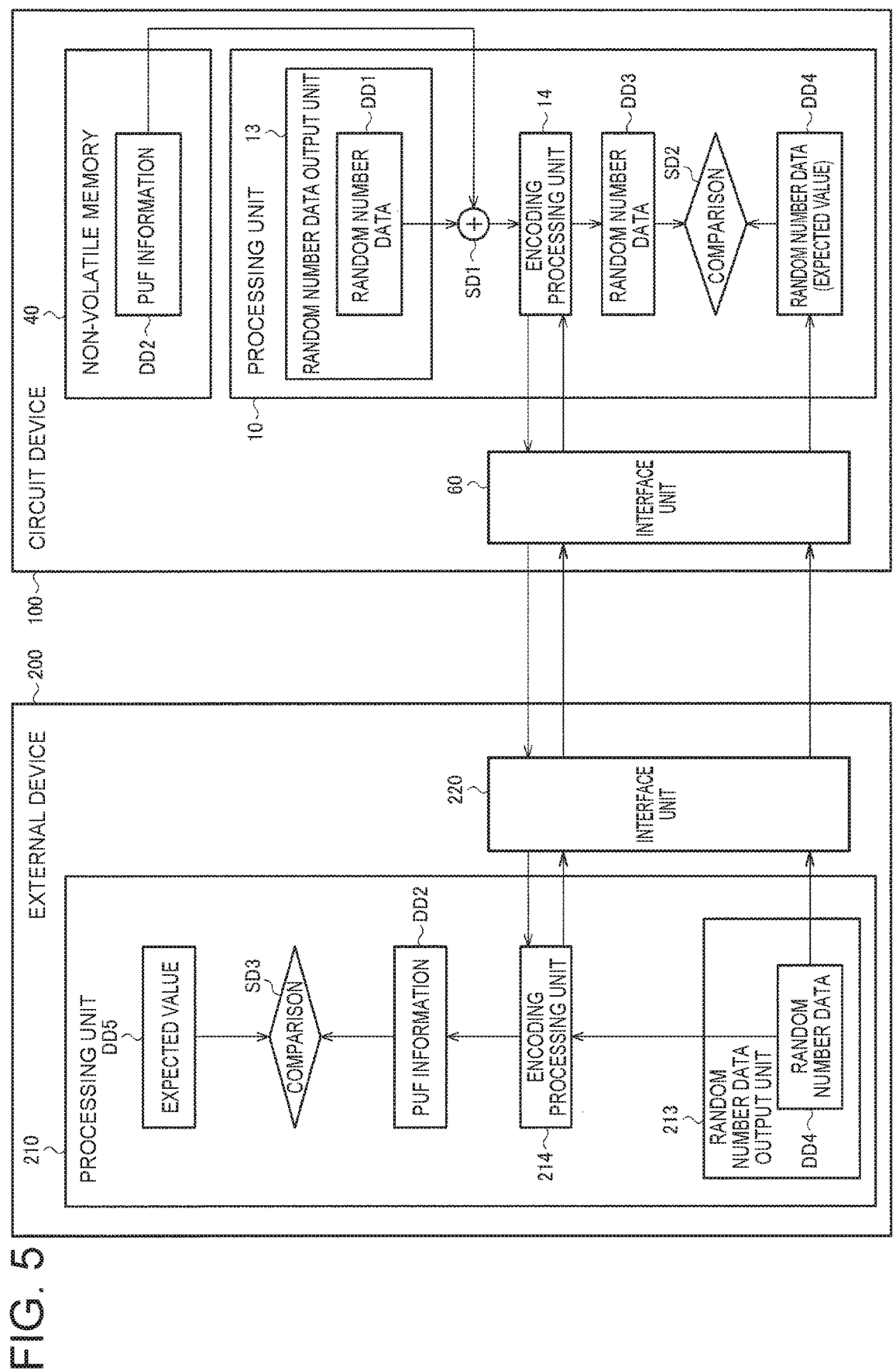
FIG. 5 illustrates a fourth detailed configuration example of the circuit device and the system including the circuit device according to this exemplary embodiment.

In this exemplary embodiment, the circuit device 100 may include an encoding processing unit (for example, an encoding processing unit 14 of FIGS. 4 and 5; encoding processing circuit). The interface unit 60 may output authentication information encoded by the encoding processing unit to the external device 200.

Examples of encoding processing (encoding, decoding) to be used may include a common key encoding system such as Advanced Encryption Standard (AES), and a public key encoding system such as RSA. The encoding processing unit may be included in the processing unit 10, for example, as illustrated in FIG. 4 and the like, or may be provided as a circuit separate from the processing unit 10.

In this manner, it is possible to improve security (it is possible to reduce a possibility that security is broken), as compared to a case where the circuit device 100 transmits authentication information to the external device 200 in non-encoded data (for example, plain text data).

In this exemplary embodiment, the interface unit 60 may receive external device authentication information for authenticating the external device 200. The processing unit 10 may perform authentication processing of the external device 200 on the basis of the external device authentication information.

Specifically, the processing unit 210 of the external device 200 transmits the external device authentication information through the interface unit 220, and the interface unit 60 of the circuit device 100 receives the external device authentication information. The external device authentication information may be PUF information or identification information, for example, similar to the authentication information which is output by the circuit device 100, or may be random data (for example, random number data or the like). The processing unit 10 of the circuit device 100 performs authentication processing on the basis of the received external device authentication information, and determines whether or not to authenticate the external device 200 (whether or not to allow communication with the external device 200). For example, the authentication processing is performed by comparing the received external device authentication information with an expected value. The subsequent communication with the external device 200 is not allowed in a case where the authentication is not successful, and a normal communication process such as data communication with the external device 200 is allowed in a case where the authentication is successful.

In this manner, it is possible to perform mutual authentication between the external device 200 and the circuit device 100 (real-time clocking device). That is, it is possible to improve security not only with respect to the forgery of the real-time clocking device but also with respect to the forgery of the external device 200.

In this exemplary embodiment, the encoding processing unit may perform decoding of encoded external device authentication information.

Specifically, the processing unit 210 of the external device 200 performs encoding of the external device authentication information, and the encoding processing unit of the circuit device 100 performs decoding processing of the encoded external device authentication information.

In this manner, it is possible to improve security as compared to a case where the external device authentication information is received by the circuit device 100 from the external device 200 in a non-encoded data (for example, plain text data). In addition, it is possible to decode the external device authentication information by sharing the encoding processing unit that encodes authentication information to be transmitted from the circuit device 100 with the external device 200.

In this exemplary embodiment, the circuit device 100 may include a random number data output unit (for example, a random number data output unit 13 in FIGS. 3 to 5; random number data output circuit; random number generator) which outputs random number data. The interface unit 60 outputs authentication information, which is generated by a combination of specific information and the random number data, to the external device 200.

Figure 3:
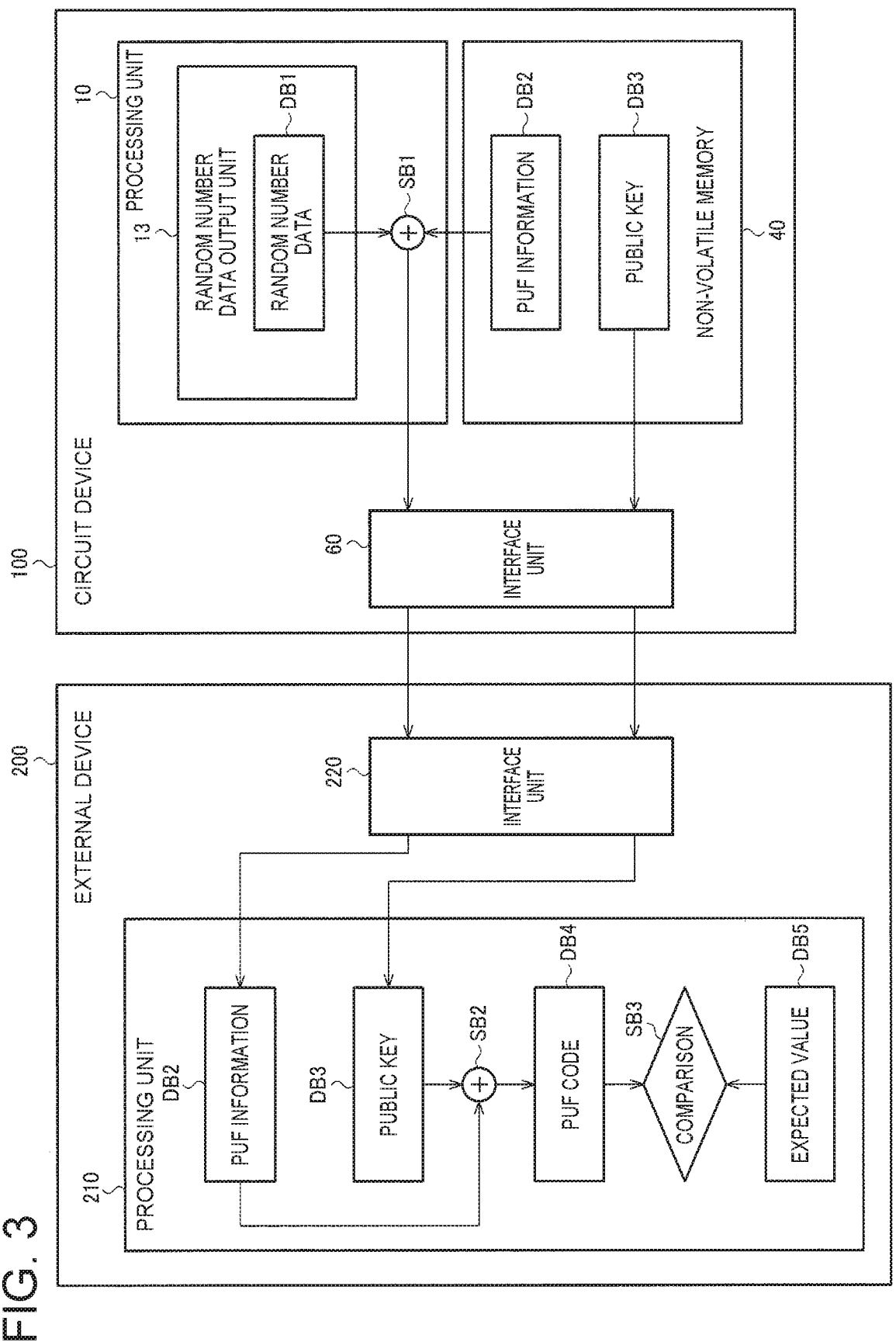
FIG. 3 illustrates a second detailed configuration example of the circuit device and the system including the circuit device according to this exemplary embodiment.

Specifically, the random number data output unit 13 outputs data having a value randomly changing in time series or data having a random value for each individual circuit device, as the random number data. The processing unit 10 combines the specific information and the random number data with each other to generate authentication information, and outputs the generated authentication information to the external device 200 through the interface unit 60. The random number data output unit may be included in the processing unit 10, for example, as illustrated in FIG. 3 and the like, or may be provided as a circuit separate from the processing unit 10. The combination information (information indicating how the combination is made) of the specific information and the random number data is shared between the circuit device 100 and the external device 200 in advance. The processing unit 210 of the external device 200 extracts specific information from the received authentication information on the basis of the combination information, and performs authentication processing on the basis of the specific information.

In this manner, the authentication information becomes complex as compared to a case where the circuit device 100 transmits authentication information, which is generated without combining with the random number data, to the external device 200, and thus it is possible to improve security (it is possible to reduce a possibility that security is breached).

In this exemplary embodiment, the authentication information is data in which bits of the specific information are allocated to predetermined bits of the authentication information and bits of the random number data are allocated to the other bits of the authentication information.

In this manner, the specific information and the random number data are combined with each other by interweaving the bits of the specific information and the bits of the random number data with each other, and thus it is possible to generate the authentication information. The external device 200 can acquire the specific information by extracting the predetermined bits having the bits of the specific information allocated thereto from the authentication information.

A method of combining the specific information and the random number data with each other is not limited thereto, and various methods can be used. For example, the authentication information may be generated by performing any computational processing (for example, addition or multiplication) using the specific information and the random number data.

In this exemplary embodiment, the interface unit 60 may output the authentication information which is generated by a combination of specific information and circuit characteristic adjustment data.

The circuit characteristic adjustment data is data for adjusting (setting) characteristics of each unit of the circuit device 100. For example, the circuit characteristic adjustment data is data for adjusting a reference voltage which is supplied to each unit of the circuit device 100. Alternatively, the above-described oscillation adjustment data may be used as the circuit characteristic adjustment data. The circuit characteristic adjustment data is, for example, trimming data of an analog circuit (for example, a resistance division circuit, an amplifier circuit, or the like which outputs a reference voltage), and is stored in, for example, the non-volatile memory 40.

Since the circuit characteristics have individual variations, individual variations also occur in the circuit characteristic adjustment data for adjusting the individual variations. For this reason, the circuit characteristic adjustment data can be used as random number data. The circuit characteristic adjustment data corresponds to the random number data having a random value for each individual circuit device described above.

In this exemplary embodiment, the authentication information is data in which bits of the specific information are allocated to predetermined bits of the authentication information and bits of the circuit characteristic adjustment data are allocated to the other bits of the authentication information.

In this manner, the specific information and the circuit characteristic adjustment data are combined with each other by interweaving the bits of the specific information and the bits of the circuit characteristic adjustment data, and thus it is possible to generate the authentication information. The external device 200 can acquire the specific information by extracting the predetermined bits having the bits of the specific information allocated thereto from the authentication information.

A method of combining the specific information and the circuit characteristic adjustment data with each other is not limited thereto, and various methods can be used. For example, the authentication information may be generated by performing any computational processing (for example, addition or multiplication) using the specific information and the circuit characteristic adjustment data.

In this exemplary embodiment, the specific information may be specific PUF information of the circuit device 100.

The PUF information is data (PUF code), specific to the circuit device, which is acquired using individual variations in hardware characteristics. As described above, an example of the PUF information is oscillation adjustment data stored in the non-volatile memory 40, SRAM initial data in a turn-on state of the power supply, or output data of the PUF circuit using individual variations in a delay time of a delay element.

Since the PUF information uses individual variations in hardware characteristics, there is an extremely low possibility that a circuit device having the same PUF information can be duplicated. Such PUF information is used as specific information, and thus it is possible to reduce a concern for the forgery of the real-time clocking device due to duplication and to improve security.

In this exemplary embodiment, the PUF information may be information which is generated on the basis of temperature compensated data of an oscillation frequency of an oscillation signal.

Specifically, the non-volatile memory 40 (storage unit) stores the temperature compensated data of the oscillation frequency of the oscillation signal. The processing unit 10 generates specific PUF information of the circuit device 100 on the basis of the temperature compensated data.

Temperature compensation includes canceling (suppressing) temperature characteristics (temperature dependency) of the oscillation frequency of the oscillation signal and maintaining the oscillation frequency constant (substantially constant). The temperature compensated data is data which is used for the temperature compensation. For example, the temperature compensated data is control data for controlling the switch of the capacitor array which is provided in the oscillation circuit. Alternatively, the temperature compensated data is data for generating the control data by the processing of the temperature compensated data. For example, control data corresponding to each temperature is stored in the non-volatile memory 40, and the capacitor array is controlled by control data corresponding to a measured temperature. The control data is temperature compensated data. Alternatively, in a case where a control voltage of VCO is generated by an approximate polynomial expression with a temperature as a variable, coefficient data of the approximate polynomial expression is temperature compensated data. The case is not limited to a case where the temperature compensated data is stored in the non-volatile memory 40, and the temperature compensated data may be stored in a RAM such as an SRAM, a register, a fuse, or the like.

According to this exemplary embodiment, the PUF information uses individual variations in hardware characteristics, and thus there is an extremely low possibility that a circuit device having the same PUF information can be duplicated. It is possible to reduce a concern for the forgery of the real-time clocking device due to duplication or the like, to reduce a concern for the forgery of the external device, and to improve security by using such PUF information. In addition, the oscillation device performing temperature compensation stores temperature compensated data, and the temperature compensated data has individual variations. For this reason, it is possible to generate the PUF information which is specific to the circuit device from the temperature compensated data.

Figure 12:
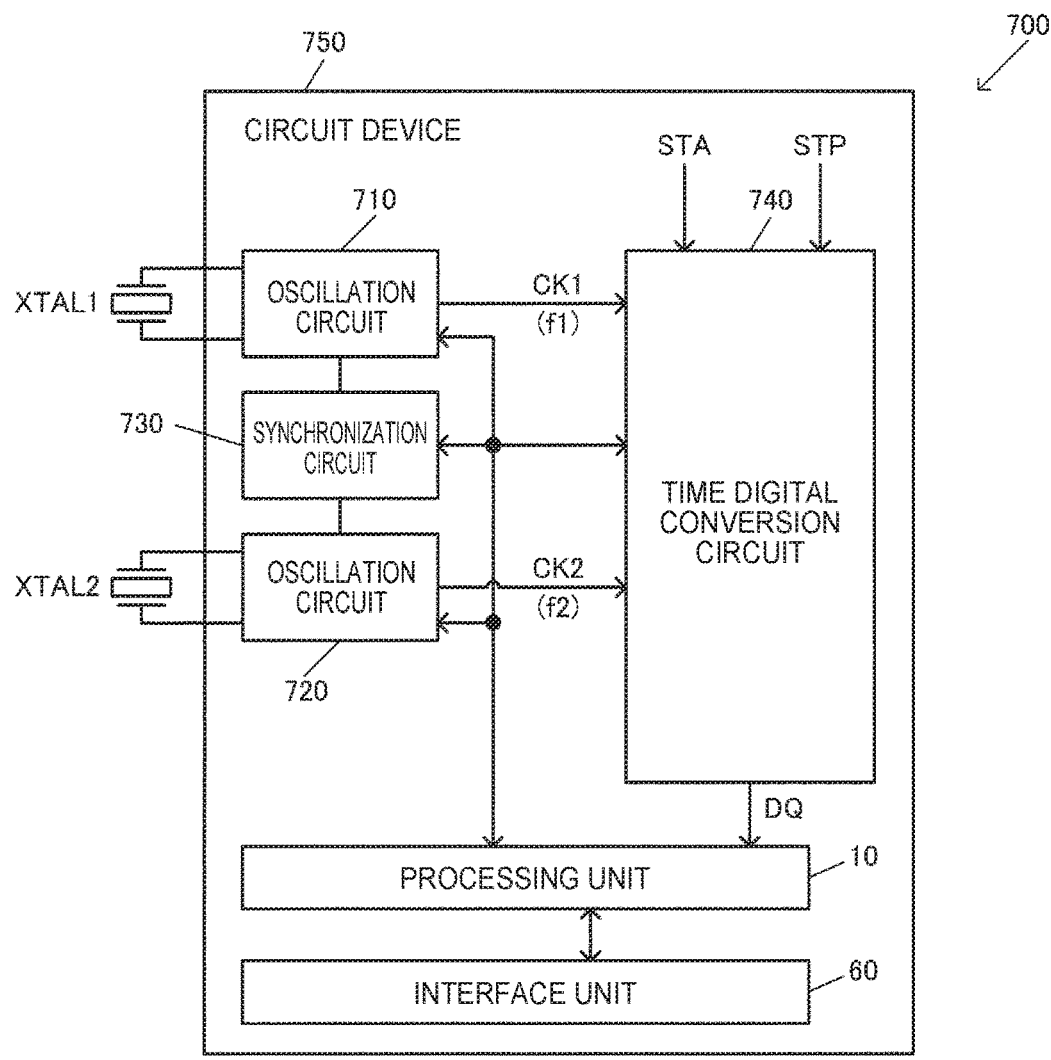
FIG. 12 illustrates a configuration example of a physical quantity measuring device.

A description has been given of an example of a case where the method according to the invention is applied to the real-time clocking device, but the method according to the invention may be applied to a physical quantity measuring device. FIG. 12 illustrates a time digital converter as an example of the physical quantity measuring device. Here, an outline will be described, and details will be described later.

In the exemplary embodiment illustrated in FIG. 12, a circuit device 750 includes a time digital conversion circuit 740 that performs time digital conversion on the basis of an oscillation signal. The interface unit 60 outputs information (for example, a digital value DQ of time) which is generated on the basis of the time digital conversion to the external device 200.

The time digital converter is used in, for example, a distance measurement sensor of a Time Of Flight (TOF) system, and the distance measurement sensor is used to cause, for example, an in-vehicle device to detect a distance to an object in the vicinity of a car. For example, such a distance measurement technique is used for driver assist or realization of automatic driving.

Such a time digital converter (physical quantity measuring device) is one of the devices that communicate with an external device (for example, SOC), similar to the real-time clocking device. That is, there is a concern for forgery, similar to the real-time clocking device. According to this exemplary embodiment, the circuit device 750 (interface unit 60) outputs authentication information to the external device 200, and thus the external device 200 can authenticate the time digital converter, and it is possible to reduce a concern for the forgery of the time digital converter. Thereby, the in-vehicle device can perform distance measurement on the basis of, for example, an output of a valid time digital converter.

2. Detailed Configuration Example of Circuit Device and System

Figure 2:
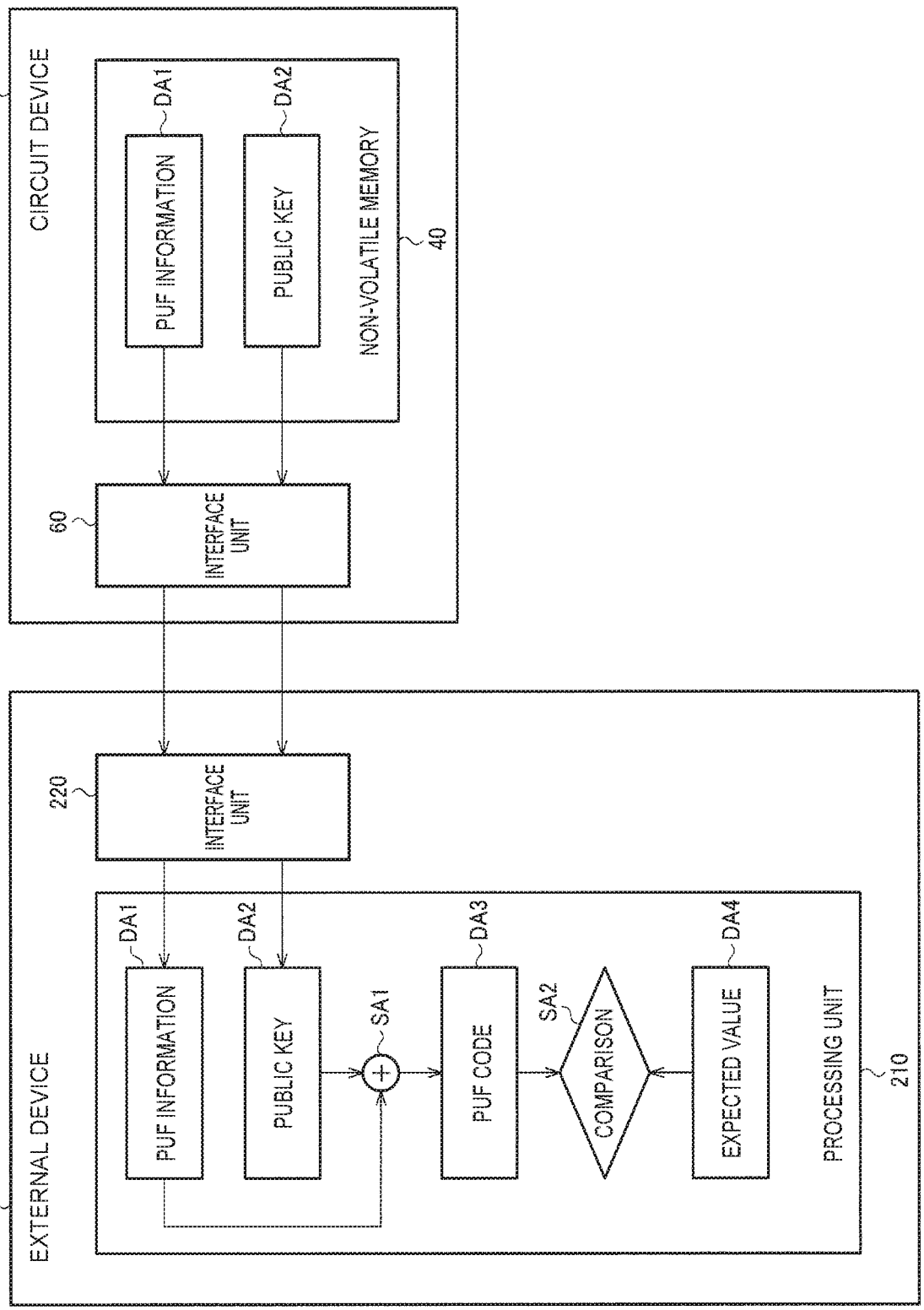
FIG. 2 illustrates a first detailed configuration example of the circuit device and a system including the circuit device according to this exemplary embodiment.

FIG. 2 illustrates a first detailed configuration example of the circuit device 100 according to this exemplary embodiment and the system including the circuit device 100. FIG. 2 schematically illustrates configurations and operations (processes). The oscillation circuit 80, the clocking unit 30, and the processing unit 10 are not shown in the drawing.

In the first detailed configuration example, the interface unit 60 of the circuit device 100 transmits PUF information DA1 to the interface unit 220 of the external device 200 as authentication information. The PUF information is, for example, data stored in the non-volatile memory 40, but is not limited thereto. The PUF information may be SRAM initial data or data which is output from the PUF circuit. In addition, specific information may be preferably output, and thus identification information (ID) may be output instead of the PUF information.

In addition, the interface unit 60 of the circuit device 100 transmits a public key DA2, stored in the non-volatile memory 40, to the interface unit 220 of the external device 200. The public key DA2 is written in the non-volatile memory 40, for example, during the manufacture of the system (during the manufacture of an electronic apparatus in which an oscillation device or a physical quantity measuring device is embedded).

The processing unit 210 of the external device 200 performs computational processing SA1 (for example, decoding processing) on the basis of the received PUF information DA1 and public key DA2 to generate a PUF code DA3. For example, the public key DA2 is key data which is generated in advance so as to be capable of decoding an expected value DA4 stored in the external device 200, from the PUF information DA1 specific to the circuit device 100. The PUF code DA3 is generated by performing decoding processing (computational processing SA1) on the PUF information DA1 by using the public key DA2.

The processing unit 210 performs a process SA2 of comparing the generated PUF code DA3 with the expected value DA4, and performs authentication processing on the basis of a comparison result. That is, the processing unit determines that the authentication has been established in a case where the PUF code DA3 and the expected value DA4 match each other, and determines that the authentication has not been established in a case where the PUF code DA3 and the expected value DA4 do not match each other.

FIG. 3 illustrates a second detailed configuration example of the circuit device 100 according to this exemplary embodiment and the system including the circuit device 100. FIG. 3 schematically illustrates configurations and operations (processes). The oscillation circuit 80 and the clocking unit 30 are not shown in the drawing. In addition, a duplicate description of the same operation as that in the first detailed configuration example will be omitted.

In the second detailed configuration example, the processing unit 10 of the circuit device 100 performs a process SB1 of combining PUF information DB2 stored in the non-volatile memory 40 and random number data DB1 which is output from the random number data output unit 13 with each other to generate authentication information. The interface unit 60 transmits the authentication information to the interface unit 220 of the external device 200. In addition, the interface unit 60 of the circuit device 100 transmits a public key DB3 stored in the non-volatile memory 40 to the interface unit 220 of the external device 200.

The processing unit 210 of the external device 200 extracts the PUF information DB2 from the received authentication information. The processing unit 210 performs computational processing SB2 (for example, decoding processing) on the basis of the extracted PUF information DB2 and the received public key DB3 to generate a PUF code DB4. The processing unit 210 performs a process SB3 of comparing the generated PUF code DB4 with an expected value DB5, and performs authentication processing on the basis of a comparison result.

FIG. 4 illustrates a third detailed configuration example of the circuit device 100 according to this exemplary embodiment and the system including the circuit device 100. FIG. 4 schematically illustrates configurations and operations (processes). The oscillation circuit 80 and the clocking unit 30 are not shown in the drawing. In addition, a duplicate description of the same operation as that in the first and the second detailed configuration examples will be omitted.

In the third detailed configuration example, the processing unit 10 of the circuit device 100 performs a process SC1 of combining PUF information DC2 stored in the non-volatile memory 40 and random number data DC1 which is output from the random number data output unit 13 with each other. The encoding processing unit 14 encodes output data of the process SC1, and the interface unit 60 transmits the encoded data to the interface unit 220 of the external device 200 as authentication information. For example, the encoding processing unit 14 performs encoding by an AES system by using a common key which is common to the external device 200. In addition, the interface unit 60 of the circuit device 100 transmits a public key DC3 stored in the non-volatile memory 40 to the interface unit 220 of the external device 200.

An encoding processing unit 214 of the external device 200 decodes the PUF information DC2 from the received authentication information. For example, the encoding processing unit 214 performs decoding by an AES system by using a common key which is common to the circuit device 100. The processing unit 210 performs computational processing SC2 (for example, decoding processing) on the basis of the decoded PUF information DC2 and the received public key DC3 to generate a PUF code DC4. The processing unit 210 performs a process SC3 of comparing the generated PUF code DC4 with an expected value DC5 to perform authentication processing on the basis of a comparison result.

FIG. 5 illustrates a fourth detailed configuration example of the circuit device 100 according to this exemplary embodiment and the system including the circuit device 100. FIG. 5 schematically illustrates configurations and operations (processes). The oscillation circuit 80 and the clocking unit 30 are not shown in the drawing. In addition, a duplicate description of the same operation as that in the first to third detailed configuration examples will be omitted.

In the fourth detailed configuration example, the external device 200 performs a first authentication process of authenticating the circuit device 100 and the circuit device 100 performs a second authentication process to authenticate the external device 200.

In the first authentication process, the processing unit 10 of the circuit device 100 performs a process SD1 of combining PUF information DD2 and random number data DD1 with each other, the encoding processing unit 14 encodes output data of the process SD1, and the interface unit 60 transmits the encoded data to the interface unit 220 of the external device 200 as authentication information. The encoding processing unit 214 of the external device 200 decodes the PUF information DD2 from the received authentication information, performs a process SD3 of comparing the decoded PUF information DD2 with an expected value DD5, and performs authentication processing on the basis of a comparison result.

In the second authentication process, a random number data output unit 213 of the external device 200 outputs random number data DD4, and the encoding processing unit 214 encodes the random number data DD4. The interface unit 220 transmits data (external device authentication information) which is obtained by encoding the random number data DD4 and the random number data DD4 which is a plain text to the interface unit 60 of the circuit device 100. The encoding processing unit 14 of the circuit device 100 decodes the received encoded data to generate random number data DD3. The processing unit 10 performs a process SD2 of comparing the decoded random number data DD3 and the received random number data DD4 (expected value) which is a plain text, and performs authentication processing on the basis of a comparison result.

3. Method of Generating Authentication Information

A description will be given of a detailed example of a method of generating authentication information from specific information in a case where temperature compensated data is used as specific information.

Figure 6:
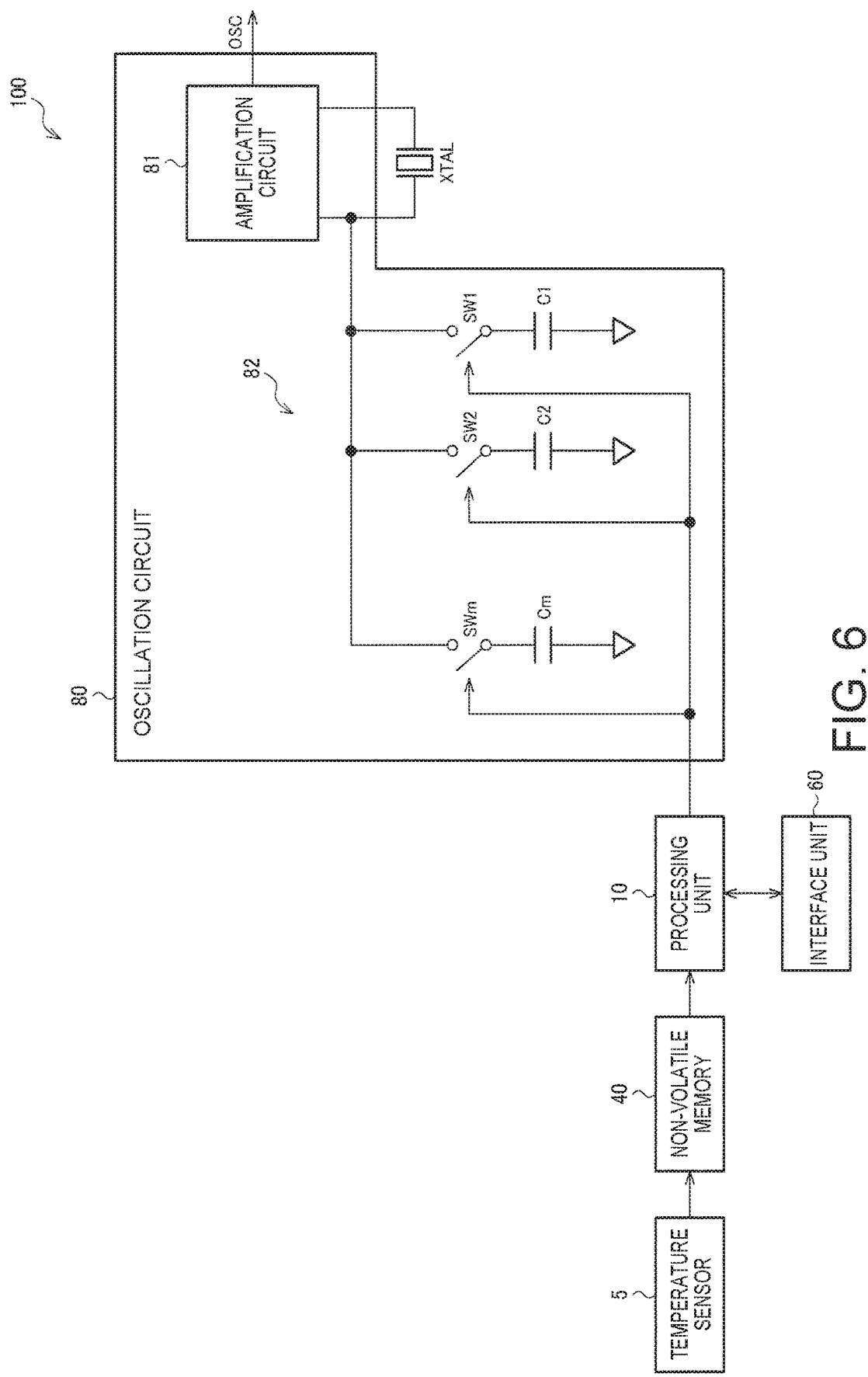
FIG. 6 illustrates a second configuration example of the circuit device and a detailed configuration example of an oscillation circuit according to this exemplary embodiment.

FIG. 6 illustrates a second configuration example of the circuit device 100 according to this exemplary embodiment and a detailed configuration example of the oscillation circuit. The circuit device 100 includes a temperature sensor 5, the non-volatile memory 40, the processing unit 10, and the oscillation circuit 80. The clocking unit 30 is not shown in FIG. 6.

The oscillation circuit 80 includes an amplification circuit 81 that drives (oscillates) the oscillator XTAL to generate an oscillation signal OSC, and a variable capacitance circuit 82 that adjusts an oscillation frequency of the oscillation signal. The amplification circuit 81 includes a first node which is connected to one end of the oscillator XTAL and a second node which is connected to the other end of the oscillator XTAL. The variable capacitance circuit 82 is provided in the first node (or the second node) of the amplification circuit 81, and is constituted by a capacitor array. Specifically, the variable capacitance circuit 82 includes switch elements SW1 to SWm each of which has one end connected to the first node, and capacitors C1 to Cm each of which has one end connected to the other end of each of the switch elements SW1 to SWm. Here, m is an integer equal to or greater than 2. The other end of each of the capacitors C1 to Cm is connected to a node of a reference voltage (for example, a low potential side power supply voltage). A capacitance value of each of the capacitors C1 to Cm is weighted by, for example, a binary (a power of 2). Each of the switch elements SW1 to SWm is constituted by, for example, a transistor.

The temperature sensor 5 is a sensor that detects the temperature (environmental temperature; the temperature of the substrate of the circuit device 100) of the circuit device 100. Specifically, the temperature sensor 5 includes a sensor circuit that outputs a temperature detection signal, and an A/D conversion circuit that performs A/D conversion of the temperature detection signal and outputs temperature detection data. For example, the sensor circuit is a circuit that generates the temperature detection signal on the basis of temperature dependency of a forward voltage of a PN junction.

The non-volatile memory 40 stores temperature compensated data corresponding to temperatures in a temperature range in which temperature compensation is performed. The non-volatile memory 40 outputs the temperature compensated data of a temperature corresponding to temperature detection data.

FIG. 7 illustrates an example of temperature compensated data stored in the non-volatile memory 40. Pieces of temperature compensated data DATA0 to DATA127 are respectively stored in storage regions of addresses 0 to 127 of the non-volatile memory 40. One address corresponds to one temperature in the temperature range. For example, the addresses 0 to 127 correspond to 128 temperatures obtained by dividing the temperature range into 128 parts. Each of the pieces of temperature compensated data DATA0 to DATA127 is data constituted by first to m-th bits D1 to Dm.

The processing unit 10 decodes the temperature detection data to the address of the non-volatile memory 40, and reads out temperature compensated data corresponding to the address from the non-volatile memory 40. The processing unit 10 outputs control signals corresponding to bits D1, D2, ..., and Dm of the temperature compensated data to the switch elements SW1, SW2, ..., and SWm of the variable capacitance circuit 82. For example, the switch element SWi is turned on when bit Di=1, and the switch element SWi is turned off when bit Di=0. Here, i is an integer equal to or greater than 1 and equal to or less than m.

In this manner, temperature compensated data based on a detected temperature is selected among the pieces of temperature compensated data DATA0 to DATA127, and connection and non-connection between the capacitors C1 to Cm are selected on the basis of the temperature compensated data, so that an oscillation frequency of the oscillation signal OSC is subjected to temperature compensation. The pieces of temperature compensated data DATA0 to DATA127 are data measured during the manufacture of the oscillation device or the physical quantity measuring device so that the oscillation frequency of the oscillation signal OSC becomes constant (including substantially constant) without depending on a temperature.

Figure 8:
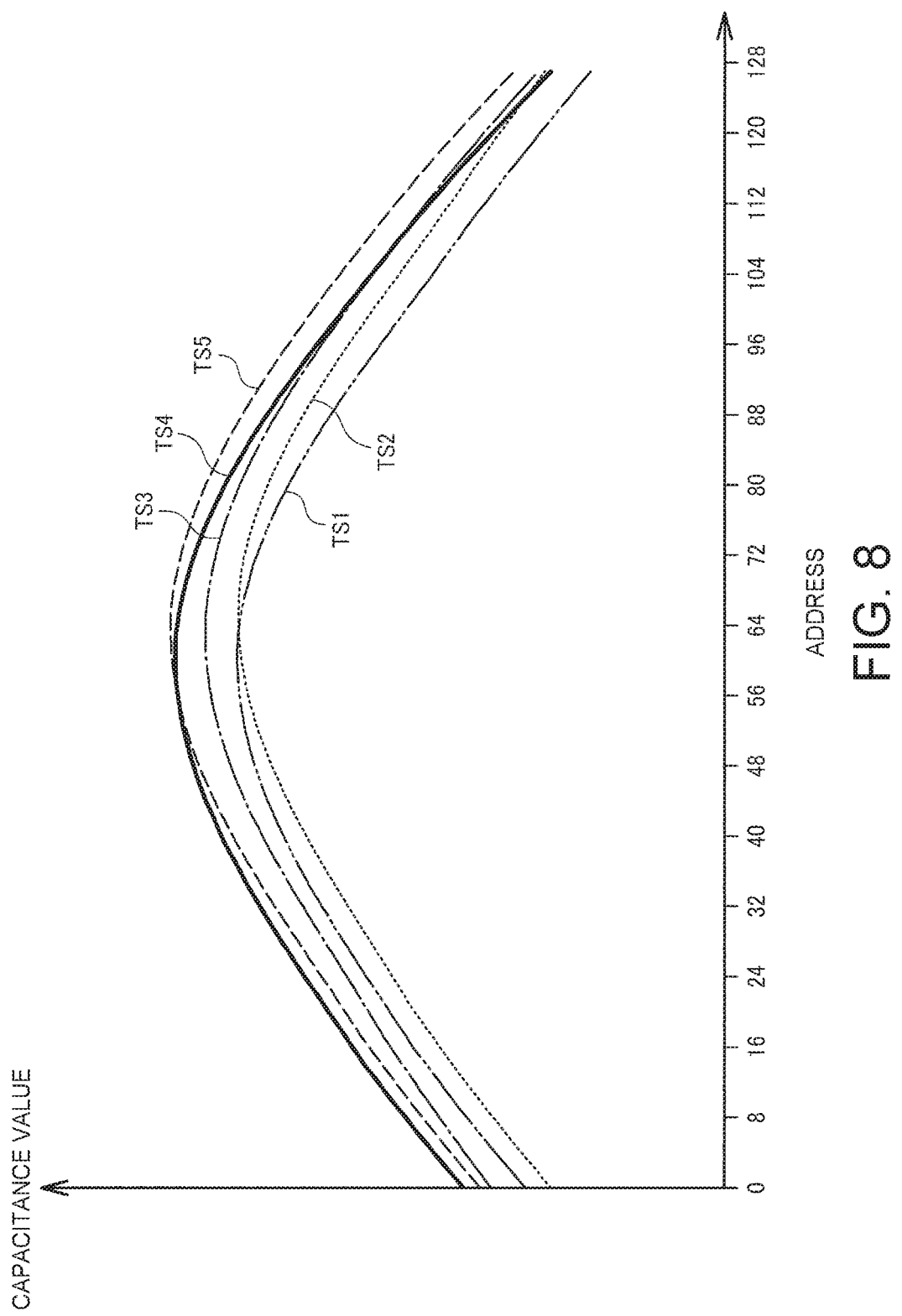
FIG. 8 illustrates a characteristic example of a capacitance value of an adjustment circuit with respect to a temperature.

FIG. 8 illustrates a characteristic example of a capacitance value of the variable capacitance circuit 82 with respect to a temperature. In FIG. 8, an address corresponding to the temperature is taken as a horizontal axis.

Temperature characteristics of the oscillation frequency of the oscillator XTAL include a characteristic of a secondary function (substantially a secondary function) with respect to a temperature. In response to this, a characteristic of the capacitance value also serves as a characteristic of a secondary function (substantially a secondary function). In FIG. 8, characteristics TS1 to TS5 of capacitance values in five samples (oscillation devices) are shown as examples. As seen from the characteristics TS1 to TS5, the characteristic of the capacitance value is different for each sample. For example, the maximum value of the secondary function, an address in which the secondary function has the maximum value, and a coefficient (for example, a secondary coefficient relates to the opening of a parabola) of each degree of the secondary function are different.

In this exemplary embodiment, temperature compensated data of some (one or a plurality of) addresses, among the pieces of temperature compensated data DATA0 to DATA127 of the addresses 0 to 127, is read out from the non-volatile memory 40, and specific information is generated on the basis of the temperature compensated data of the plurality of addresses. For example, in a case where temperature compensated data of one address is data of 10 bits (m=10) and 100 bits of specific information are generated, temperature compensated data is read out from ten addresses, and the ten pieces of temperature compensated data are combined to form specific information. For example, 10 bits×ten pieces of temperature compensated data are aligned in order from an LSB side of the specific information to be set to be 100 bits of data.

FIG. 9 illustrates an example of the selection of an address at the time of generating specific information. Examples 1 to 6 show address regions in which a variation (difference in capacitance value) in a characteristic of the capacitance value tends to occur when various parameters are changed. In this exemplary embodiment, specific information is generated by selecting temperature compensated data from the address region in which such a difference tends to occur. Hereinafter, a description will be given of an example of a case where an address 0 corresponds to the lowest temperature in a temperature range and an address 127 corresponds to the highest temperature in the temperature range.

As shown in Example 1, in a case where (it is assumed that) a secondary coefficient of a temperature characteristic of an oscillation frequency of an oscillator is changed as a parameter and the other parameters are fixed, it is supposed that variations in temperature compensated data of a low temperature-side address and a high temperature-side address are increased.

The low temperature-side address is an address corresponding to a temperature on a low temperature side among the addresses 0 to 127. Specifically, the low temperature-side address is the address 0 or a plurality of addresses (for example, two to five addresses) in the vicinity of the address 0. The high temperature-side address is an address corresponding to a temperature on a high temperature side among the addresses 0 to 127. Specifically, the high temperature-side address is the address 127 or a plurality of addresses (for example, two to five addresses) in the vicinity of the address 127.

As shown in Example 2, in a case where (it is assumed that) a peak temperature (temperature having a maximum value) of a temperature characteristic of an oscillation frequency of an oscillator is changed as a parameter and the other parameters are fixed, it is supposed that variations in temperature compensated data of a low temperature-side address and a high temperature-side address are increased.

As shown in Example 3, in a case where (it is assumed that) an oscillation frequency of an oscillator at 25° C. (so-called room temperature) is changed as a parameter and the other parameters are fixed, it is supposed that variations in temperature compensated data of a middle temperature address are increased.

The middle temperature address is an address between a low temperature-side address and a high temperature-side address among the addresses 0 to 127. Specifically, the middle temperature address is an address 63 or a plurality of addresses (for example, two to five addresses) in the vicinity of the address 63.

As shown in Example 4, in a case where (it is assumed that) a regulation characteristic of a capacitance value of an adjustment circuit that adjusts an oscillation frequency of an oscillator is changed as a parameter and the other parameters are fixed, it is supposed that variations in temperature compensated data of a low temperature-side address and a high temperature-side address are increased. The regulation characteristic is a characteristic of an oscillation frequency with respect to the capacitance value of the adjustment circuit, and a slope of the characteristic shows a change in the oscillation frequency with respect to a change (sensitivity) in the capacitance value.

As shown in Example 5, in a case where (it is assumed that) an A/D conversion accuracy of an A/D conversion circuit performing A/D conversion of a temperature detection signal is changed as a parameter and the other parameters are fixed, it is supposed that variations in temperature compensated data of a low temperature-side address and a high temperature-side address are increased.

As shown in Example 6, in a case where (it is assumed that) a variation in a capacitance value of each of the capacitors C1 to Cm of the adjustment circuit is changed as a parameter and the other parameters are fixed, it is supposed that variations in temperature compensated data of a low temperature-side address and a high temperature-side address are increased.

From Examples 1 to 6 described above, in this exemplary embodiment, pieces of temperature compensated data of a low temperature-side address, a high temperature-side address, and an address therebetween (middle temperature address) are used as specific information. For example, one or, preferably two or more of the low temperature-side address, the high temperature-side address, and the address therebetween are used. It is expected that the uniqueness of specific information increases (redundancy decreases) when the temperature compensated data is selected from a plurality of temperature regions. In addition, it is expected that the uniqueness of specific information increases as the number of addresses to be selected increases.

4. Detailed Configuration Example of Circuit Device

Figure 10:
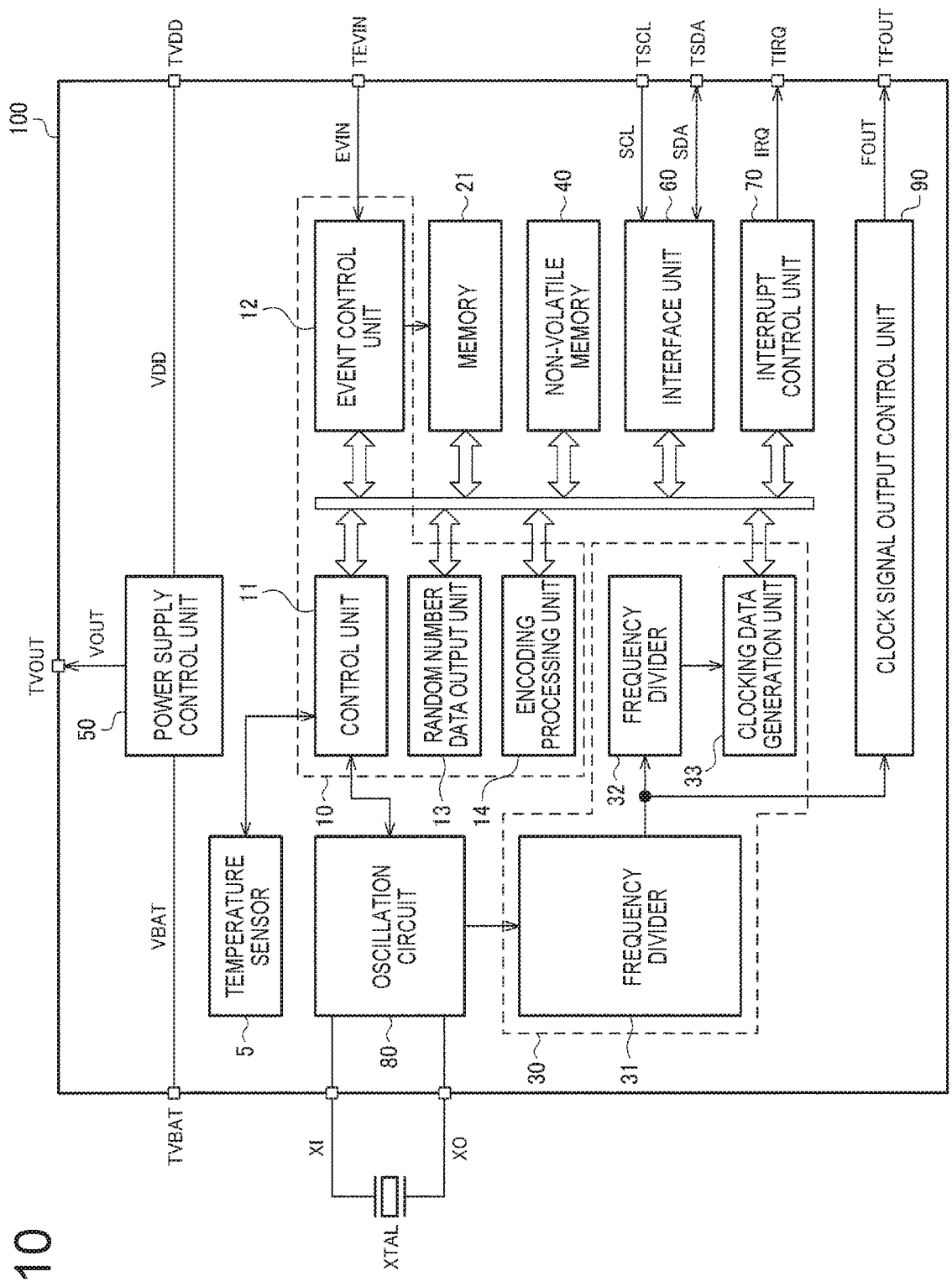
FIG. 10 illustrates a detailed configuration example of the circuit device according to this exemplary embodiment.

FIG. 10 illustrates a detailed configuration example of the circuit device 100 according to this exemplary embodiment. The circuit device 100 includes a processing unit 10 (processing circuit), a memory 21, a non-volatile memory 40, a clocking unit 30 (clocking circuit), and a temperature sensor 5. In addition, the circuit device 100 includes a power supply control unit 50 (power supply control circuit), an interface unit 60 (interface circuit), an interrupt control unit 70 (interrupt control circuit), an oscillation circuit 80, a clock signal output control unit 90 (clock signal output circuit), and terminals TVBAT, TVOUT, TVDD, TEVIN, TSCL, TSDA, TIRQ, TFOUT, XI, and XO. The same components as the components described in FIG. 1 and the like are denoted by the same reference numerals and signs, and a duplicate description thereof will be omitted. Here, the circuit device is not limited to the configuration of FIG. 10, and various modifications such as the omission of a portion of the components and the addition of other components can be made thereto.

A backup power supply voltage VBAT supplied from a backup power supply is input to the terminal TVBAT. A main power supply voltage VDD supplied from the main power supply is input to the terminal TVDD. The power supply control unit 50 selects the main power supply voltage VDD or the backup power supply voltage VBAT, and supplies the selected voltage to each unit of the circuit device 100 as a voltage VOUT (internal power supply voltage of the circuit device 100). Specifically, the power supply control unit selects the main power supply voltage VDD in a case where the main power supply voltage VDD exceeds a predetermined voltage, and selects the backup power supply voltage VBAT in a case where the main power supply voltage VDD is less than the predetermined voltage. For example, the power supply control unit 50 includes a comparator that compares the main power supply voltage VDD and the predetermined voltage with each other, and an analog switch circuit of which the turn-on and turn-off are controlled on the basis of an output of the comparator.

The processing unit 10 includes a control unit 11 that controls each unit of the circuit device 100, and an event control unit 12 that performs an event control process.

Specifically, a signal EVIN indicating whether or not an event (external event) has occurred is input to the event control unit 12 through the terminal TEVIN from the outside of the circuit device 100. In a case where the signal EVIN changes from a non-active state to an active state, the event control unit 12 notifies the control unit 11 of the change. In a case where the control unit 11 receives the notification, the control unit writes a time stamp (clocking data) of the event in the memory 21. The memory 21 is a RAM such as an SRAM.

The random number data output unit 13 outputs random number data to be combined with specific information. The control unit 11 combines the specific information and the random number data with each other to generate authentication information, and outputs the generated authentication information to the encoding processing unit 14. The encoding processing unit 14 encodes the authentication information and outputs the encoded authentication information to the interface unit 60.

The oscillation circuit 80 is connected to one end of the oscillator XTAL through the terminal XI and is connected to the other end of the oscillator XTAL through the terminal XO to drive and oscillate the oscillator XTAL. For example, the oscillation circuit 80 has the configuration described in FIG. 6, but is not limited thereto. For example, in a case where temperature compensation is not performed, the variable capacitance circuit 82 may be omitted.

The oscillator XTAL is a piezoelectric vibrator such as a quartz crystal vibrator. Alternatively, the oscillator XTAL may be a resonator (an electromechanical resonator or an electrical resonance circuit). Examples of the oscillator XTAL to be adopted may include a piezoelectric vibrator, a Surface Acoustic Wave (SAW) resonator, a Micro Electro Mechanical Systems (MEMS) vibrator, and the like. Examples of a substrate material of the oscillator XTAL to be used may include a piezoelectric material such as piezoelectric single crystal, for example, quartz, lithium tantalate, and lithium niobate, piezoelectric ceramics, for example, lead zirconate titanate, a silicon semiconductor material, and the like. As excitation means of the oscillator XTAL, excitation means based on a piezoelectric effect may be used, or electrostatic driving based on a Coulomb force may be used.

The clocking unit 30 includes a frequency divider 31 performs frequency division of the oscillation signal generated by the oscillation circuit 80 to generate a clock signal of a predetermined frequency (for example, 1 kHz), a frequency divider 32 that further performs frequency division of the clock signal generated by the frequency divider 31 to generate a clock signal of 1 Hz, and a clocking data generation unit 33 that counts the clock signal of 1 Hz to generate clocking data.

For example, the clocking data generation unit 33 includes a counter that counts clock signals of 1 Hz, and a conversion unit that converts a counted value of the counter into clocking data (data of year, month, day, hour, minute, and second). An initial value of the clocking data is written through the interface unit 60 when the circuit device 100 (real-time clocking device) is first turned on, and the clocking data is updated per second, starting from the initial value.

The clock signal output control unit 90 selects any one of a plurality of clock signals (the clock signals have different frequencies) based on an oscillation signal, and outputs the selected clock signal to the outside of the circuit device 100 from the terminal TFOUT as a clock signal FOUT. In addition, the clock signal output control unit 90 can also set the clock signal FOUT to be in a non-active state (a non-output state, a stop state).

The interface unit 60 performs digital interface communication between an external device and the circuit device 100. For example, the interface unit 60 is a circuit that performs serial interface communication such as an I2C system or an SPI system. FIG. 10 illustrates a case using the I2C system, and the interface unit 60 inputs and outputs a serial data signal SDA through the terminal TSDA on the basis of a clock signal SCL which is input from the terminal TSCL.

The interrupt control unit 70 performs control for outputting an interrupt signal IRQ to an external device through the terminal TIRQ. For example, in a case where the occurrence of an event is detected by the event control unit 12, the interrupt control unit 70 sets the interrupt signal IRQ to be in an active state.

The processing unit 10, the clocking unit 30, the interface unit 60, the interrupt control unit 70, and the clock signal output control unit 90 are constituted by a logic circuit such as a gate array.

Figure 11:
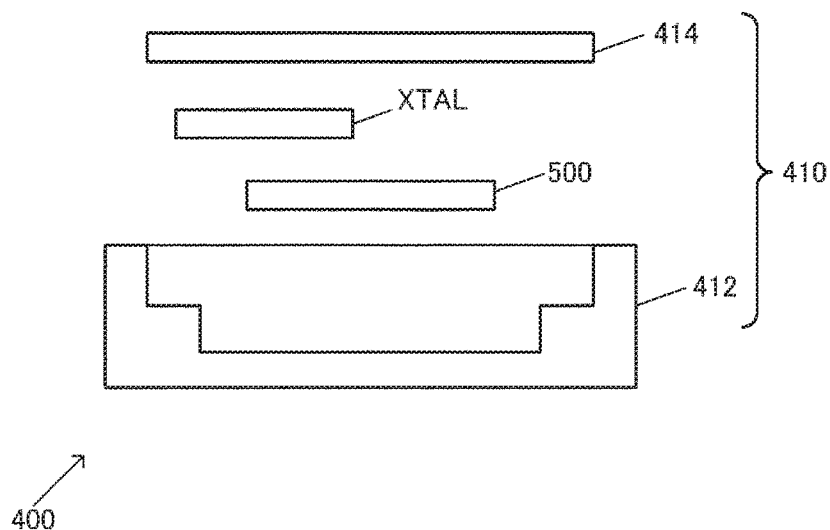
FIG. 11 illustrates a configuration example of an oscillation device.

5. Oscillation Device, Physical Quantity Measuring Device, Electronic Apparatus, and Vehicle FIG. 11 illustrates a configuration example of an oscillation device including the circuit device according to this exemplary embodiment. An oscillation device 400 includes a circuit device 500 and an oscillator XTAL (vibrator, vibration piece). In addition, the oscillation device 400 may include a package 410 in which the circuit device 500 and the oscillator XTAL are accommodated. The oscillation device is not limited to the configuration of FIG. 11, and various modifications such as the omission of a portion of the components and the addition of other components can be made thereto.

For example, the oscillation device 400 is a real-time clocking device, or an oscillator that does not have a real-time clocking function. The oscillator is, for example, a Simple Packaged crystal Oscillator (SPXO), a Temperature Compensated crystal Oscillator (TCXO), an Oven Controlled crystal Oscillator (OCXO), or the like. In a case of the real-time clocking device, the circuit device 500 corresponds to, for example, the circuit device 100 of FIGS. 1 and 10. In a case of the oscillator, the circuit device 500 includes, for example, an oscillation circuit 80, a processing unit 10, and an interface unit 60. In addition, the circuit device 500 may include, for example, a temperature sensor and an A/D conversion circuit.

The package 410 includes, for example, a base portion 412 and a lid portion 414. The base portion 412 is, for example, a box-shaped member including an insulating material such as ceramic, and the lid portion 414 is, for example, a flat plate-shaped member which is bonded to the base portion 412. For example, the bottom surface of the base portion 412 is provided with an external connection terminal (external electrode) for connection to an external apparatus. The circuit device 500 and the oscillator XTAL are accommodated in an inner space (cavity) formed by the base portion 412 and the lid portion 414. The circuit device 500 and the oscillator XTAL are airtightly sealed in the package 410 by the lid portion 414. The circuit device 500 and the oscillator XTAL are mounted within the package 410. A terminal of the oscillator XTAL and a terminal (pad) of the circuit device 500 (IC) are electrically connected to each other by an internal wiring of the package 410.

FIG. 12 illustrates a configuration example of a physical quantity measuring device including the circuit device according to this exemplary embodiment. Hereinafter, a description will be given of an example of a case where the physical quantity measuring device is a time digital converter (TDC), but is not limited thereto. The physical quantity measuring device may be a device (sensor) that measures a physical quantity by using an oscillator. For example, the physical quantity measuring device may be a gyro sensor (vibration gyro).

A physical quantity measuring device 700 of FIG. 12 includes oscillators XTAL1 and XTAL2 and a circuit device 750. The circuit device 750 includes oscillation circuits 710 and 720, a synchronization circuit 730, a time digital conversion circuit 740, a processing unit 10, and an interface unit 60. The physical quantity measuring device is not limited to the configuration of FIG. 12, and various modifications such as the omission of a portion (for example, a synchronization circuit) of the components and the addition of other components can be made thereto.

The oscillation circuit 710 oscillates the oscillator XTAL1 to generate a first clock signal CK1 of a first clock frequency f1. The oscillation circuit 720 oscillates the oscillator XTAL2 to generate a second clock signal CK2 of a second clock frequency f2. The synchronization circuit 730 is a circuit that synchronizes the phases of the first clock signal CK1 and the second clock signal CK2 for each predetermined cycle, and is, for example, a PLL circuit. The time digital conversion circuit 740 converts a time difference in a transition timing between a first signal STA (start signal) and a second signal STP (stop signal) into a digital value DQ, with a resolution corresponding to a frequency difference between the first clock signal CK1 and the second clock signal CK2. The time digital conversion circuit 740 may output (spontaneousness) the first signal STA on the basis of the first clock signal DK1. The processing unit 10 performs the control of each unit of the circuit device 100. In addition, the processing unit 10 outputs the digital value DQ or data generated on the basis of the digital value DQ to an external device through the interface unit 60. In addition, the processing unit 10 performs the authentication processing described in FIG. 1 and the like. The circuit device 750 may include a non-volatile memory storing specific information, and the processing unit 10 may output authentication information on the basis of the specific information.

Figure 13:
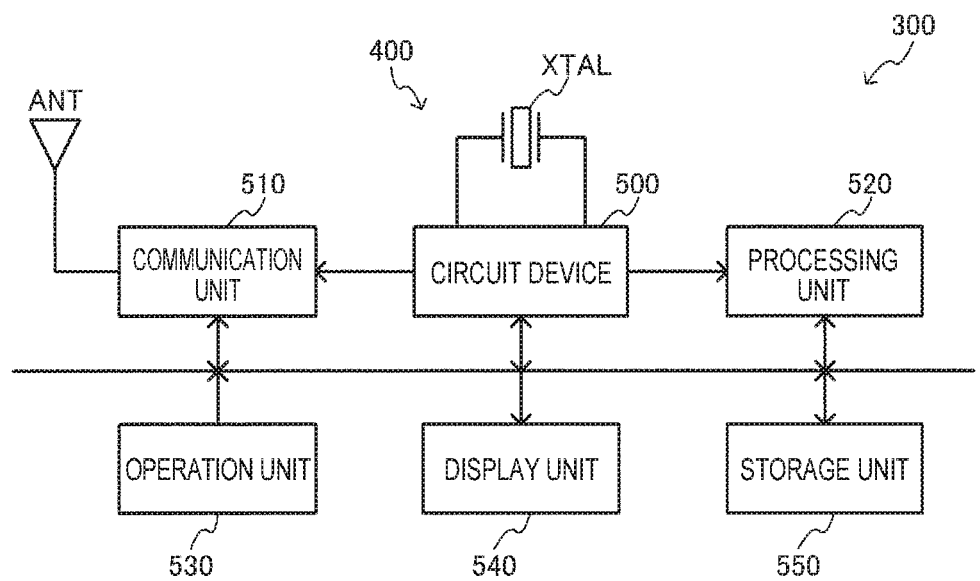
FIG. 13 illustrates a configuration example of an electronic apparatus.

FIG. 13 illustrates a configuration example of an electronic apparatus 300 including the circuit device according to this exemplary embodiment. The electronic apparatus 300 includes a circuit device 500, an oscillator XTAL such as a quartz crystal vibrator, an antenna ANT, a communication unit 510 (communication device), and a processing unit 520 (processing device). In addition, the electronic apparatus may include an operation unit 530 (operation device), a display unit 540 (display device), and a storage unit 550 (memory). The oscillation device 400 is constituted by the oscillator XTAL and the circuit device 500. The electronic apparatus 300 is not limited to the configuration of FIG. 13, and various modifications such as the omission of a portion of the components and the addition of other components can be made thereto. For example, the electronic apparatus may include the physical quantity measuring device 700 instead of the oscillation device 400.

Examples of the electronic apparatus 300 of FIG. 13 which are to be assumed may include an on-vehicle electronic device such as an Electronic Control Unit (ECU) or a meter panel, a video apparatus such as a digital camera or a video camera, and a printing apparatus such as a printer or a multi-function printer. Alternatively, it is possible to assume various apparatuses, for example, a wearable apparatus such as a GPS-incorporated time piece, a biological information measurement apparatus (a pulse wave meter, a pedometer, or the like) or a head-mounted display device, a portable information terminal (mobile terminal) such as a smartphone, a mobile phone, a portable game device, a notebook PC, or a tablet PC, a content provision terminal that distributes a content, and a network-related apparatus such as a base station or a router.

The communication unit 510 (wireless circuit) performs a process of receiving data from the outside through the antenna ANT and transmitting data to the outside. The processing unit 520 performs control processing of the electronic apparatus 300, various digital processing of data transmitted and received through the communication unit 510, and the like. The function of the processing unit 520 can be realized by a processor such as a micro computer. The operation unit 530 is a unit for causing a user to perform an input operation, and can be realized by an operation button, a touch panel display, or the like. The display unit 540 is a unit for displaying various pieces of information, and can be realized by a display such as a liquid crystal display or an organic EL. In a case where a touch panel display is used as the operation unit 530, the touch panel display can also serve as the operation unit 530 and the display unit 540. The storage unit 550 stores data, and the function thereof can be realized by a semiconductor memory such as a RAM or a ROM, a hard disk drive (HDD), or the like.

Figure 14:
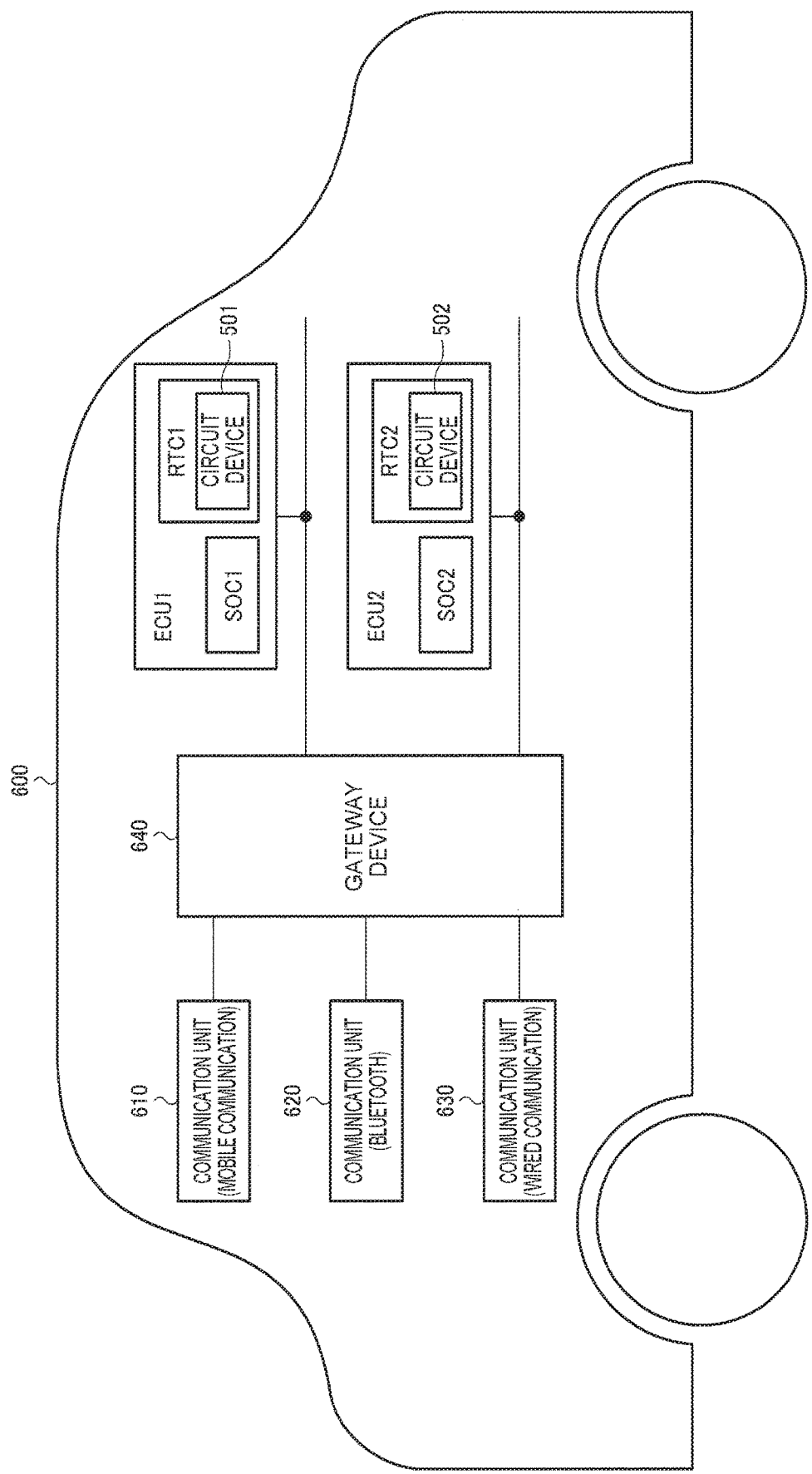
FIG. 14 illustrates a configuration example of a vehicle.

FIG. 14 illustrates an example of a vehicle including the circuit device according to this exemplary embodiment. The circuit device (oscillation device, physical quantity measuring device) according to this exemplary embodiment can be embedded in various vehicles such as a car, an airplane, a motorcycle, a bicycle, and a ship. The vehicle is an apparatus or a device that moves on the ground and in the sky and the sea by including a driving mechanism such as an engine or a motor, a steering mechanism such as a handle or a rudder, and various electronic apparatuses (on-vehicle apparatus). FIG. 14 schematically illustrates an automobile 600 as a specific example of the vehicle. The automobile 600 includes a communication unit 610 that performs mobile communication such as portable wireless communication, a communication unit 620 that performs Bluetooth (registered trademark) communication, a communication unit 630, such as a USB, which performs wired communication, a gateway device 640 that performs gateway processing of an internal network together with the communication units, and control units (control devices) ECU1 and ECU2 that are connected to the internal network. The control units ECU1 and ECU2 are control units that perform system control, such as engine control, which is related to traveling, control units that perform system control related to a body such as the opening and closing of doors, control units, such as car audios, which perform information processing, or the like. The control unit ECU1 includes a processing device SOC1 (external device), and a real-time clocking device RTC1 that communicates with the processing device SOC1. The real-time clocking device RTC1 includes a circuit device 501. The control unit ECU2 includes a processing device SOC2 (external device), and a real-time clocking device RTC2 that communicates with the processing device SOC2. The real-time clocking device RTC2 includes a circuit device 502. The circuit devices 501 and 502 correspond to, for example, the circuit device 100 of FIGS. 1 and 10. The control units ECU1 and ECU2 may include an oscillation device other than a real-time clocking device, or may include a physical quantity measuring device (the circuit device 750 of FIG. 12).

While this exemplary embodiment has been described in detail, one skilled in the art can easily understand that a number of modifications can be made without substantially departing from the new matters and effects of the invention. Therefore, all such modifications are included in the scope of the invention. For example, a term described at least once along with a different term having a broader meaning or the same meaning in the description or drawings can be replaced with the different term at any location in the description or drawings. In addition, all combinations of this exemplary embodiment and the modification examples are included in the scope of the invention. In addition, the configurations, operations, and the like of the circuit device, the oscillation device, the physical quantity measuring device, the electronic apparatus, the vehicle and the like are not limited to those described in this exemplary embodiment and can be modified in various ways.

The entire disclosures of Japanese patent application nos. 2017-010045 filed Jan. 24, 2017 and 2017-205959 filed Oct. 25, 2017 are expressly incorporated herein by reference.

What is claimed is:

1. A circuit device comprising:
an oscillation circuit configured to generate an oscillation signal;
a processing circuit configured to control the oscillation circuit;
a non-volatile memory configured to store predetermined oscillation adjustment data of the oscillation circuit as specific information uniquely identifying the circuit device, wherein the processing circuit is configured to perform an oscillation adjustment based on the oscillation adjustment data;
an interface circuit configured to output, to an external device, authentication information corresponding to the specific information, wherein the oscillation adjustment data is temperature compensation data stored in regions of multiple addresses of the non-volatile memory,
wherein each of the addresses corresponds to a respective temperature, and
wherein the processing circuit is configured to extract the temperature compensation data of at least one of the addresses to generate the authentication information; and
a clock module including (i) a frequency divider configured to divide the oscillation signal and (ii) a clocking data generation unit configured to generate clocking data based on the oscillation signal, wherein the clocking data is real-time clock information, and
wherein the interface circuit is configured to output the clocking data to the external device.

2. The circuit device according to claim 1,
wherein the interface circuit is configured to receive external device authentication information, and
wherein the processing circuit is configured to authenticate the external device based on the external device authentication information.

3. The circuit device according to claim 1, further comprising:
an encoding processing circuit configured to encode the authentication information,
wherein the interface circuit is configured to output the authentication information encoded by the encoding processing circuit to the external device.

4. The circuit device according to claim 2, further comprising:
an encoding processing circuit configured to decode the external device authentication information.

5. The circuit device according to claim 1, further comprising:
a random number data output circuit configured to output random number data,
wherein the authentication information is a combination of the specific information and the random number data.

6. The circuit device according to claim 5,
wherein the authentication information is data including predetermined bits and other bits, and bits of the specific information are allocated to the predetermined bits and bits of the random number data are allocated to the other bits.

7. The circuit device according to claim 1,
wherein the authentication information is a combination of the specific information and circuit characteristic adjustment data.

8. The circuit device according to claim 7,
wherein the authentication information is data including predetermined bits and other bits, and bits of the specific information are allocated to the predetermined bits and bits of the circuit characteristic adjustment data are allocated to the other bits.

9. The circuit device according to claim 1,
wherein the specific information is specific Physically Unclonable Function information of the circuit device.

10. The circuit device according to claim 9,
wherein the specific Physically Unclonable Function information is based on temperature compensated data of an oscillation frequency of the oscillation signal.

11. The circuit device according to claim 1, further comprising:
a time digital conversion circuit configured to perform time digital conversion based on the oscillation signal,
wherein the interface circuit is configured to output additional information to the external device, the additional information being generated based on the time digital conversion.

12. A circuit device comprising:
an oscillation circuit configured to generate an oscillation signal;
a processing circuit configured to control the oscillation circuit;
a non-volatile memory configured to store predetermined oscillation adjustment data of the oscillation circuit as Physically Unclonable Function information uniquely identifying the circuit device, wherein the processing circuit is configured to perform an oscillation adjustment based on the oscillation adjustment data;
an interface circuit configured to output, to an external device, authentication information, the authentication information corresponding to the Physically Unclonable Function information,
wherein the oscillation adjustment data is temperature compensation data stored in regions of multiple addresses of the non-volatile memory,
wherein each of the addresses corresponds to a respective temperature, and
wherein the processing circuit is configured to extract the temperature compensation data of at least one of the addresses to generate the authentication information; and a clock module including (i) a frequency divider configured to divide the oscillation signal and (ii) a clocking data generation unit configured to generate clocking data based on the oscillation signal, wherein the clocking data is real-time clock information, and wherein the interface circuit is configured to output the clocking data to the external device.

13. The circuit device according to claim 12, further comprising:

an encoding processing circuit configured to encode the authentication information prior to output by the interface circuit to the external device.

14. The circuit device according to claim 12, further comprising:

a random number data output circuit configured to output random number data, wherein the authentication information is a combination of the Physically Unclonable Function information and the random number data.

15. The circuit device according to claim 14, further comprising:

an encoding processing circuit configured to encode the authentication information prior to output by the interface circuit to the external device.

16. A circuit device comprising:

an oscillation circuit configured to generate an oscillation signal;

a processing circuit configured to control the oscillation circuit;

a non-volatile memory configured to store predetermined oscillation adjustment data of the oscillation circuit as Physically Unclonable Function information uniquely identifying the circuit device, wherein the processing circuit is configured to perform an oscillation adjustment based on the oscillation adjustment data;

a random number data output circuit configured to output random number data;

an interface circuit configured to output, to an external device, authentication information that is generated using at least a portion of the oscillation adjustment data stored in the non-volatile memory;

an encoding processing circuit configured to encode the authentication information prior to output by the interface circuit to the external device, wherein the authentication information is a combination of the Physically Unclonable Function information and the random number data, wherein the oscillation adjustment data is temperature compensation data stored in regions of multiple addresses of the non-volatile memory, wherein each of the addresses corresponds to a respective temperature, and wherein the processing circuit is configured to extract the temperature compensation data of at least one of the addresses to generate the authentication information; and a clock module including (i) a frequency divider configured to divide the oscillation signal and (ii) a clocking data generation unit configured to generate clocking data based on the oscillation signal, wherein the clocking data is real-time clock information, and wherein the interface circuit is configured to output the clocking data to the external device.

* * * * *